(12) United States Patent
Maruta et al.

(10) Patent No.: US 6,960,069 B2
(45) Date of Patent: Nov. 1, 2005

(54) ARRANGEMENT STRUCTURE OF SWASH PLATE HYDRAULIC PUMP HYDRAULIC PUMP

(75) Inventors: Kazuhiro Maruta, Kawaguchi (JP); Katsuji Ishikawa, Yokohama (JP)

(73) Assignee: Komatsu Ltd., (JP)

( * ) Notice: Subject to any disclaimer, the term of this patent is extended or adjusted under 35 U.S.C. 154(b) by 14 days.

(21) Appl. No.: 10/237,662

(22) Filed: Sep. 10, 2002

(65) Prior Publication Data

US 2003/0046930 A1   Mar. 13, 2003

(30) Foreign Application Priority Data

Sep. 12, 2001 (JP) .............................. 2001-276539

(51) Int. Cl.[7] .......................... F04B 23/04; F04B 1/12; F04B 17/00; F01B 13/04; F01B 3/00
(52) U.S. Cl. .................. 417/429; 417/62; 417/269; 417/199.1; 417/316; 91/472; 91/499; 92/12.2
(58) Field of Search ................ 417/223, 269, 417/199.1, 236, 238, 350, 360, 426, 429, 417/62, 3, 2, 316; 60/484, 486; 91/472, 499, 91/506, 507; 92/12.2; 74/15.8, 15.84, 15.86

(56) References Cited

U.S. PATENT DOCUMENTS 2,914,219 A * 11/1959 Chiantelassa ............... 222/134
3,741,360 A * 6/1973 Patton ....................... 192/87.19
4,534,271 A * 8/1985 Forster ......................... 91/472
5,354,180 A * 10/1994 Forster ..................... 417/199.1
5,800,134 A * 9/1998 Hasegawa et al. .......... 417/269
5,957,666 A * 9/1999 Lee ............................. 417/269

FOREIGN PATENT DOCUMENTS

| JP | 3-59275 | 9/1991 |
| JP | 8-121328 | 5/1996 |
| JP | 2001-140748 | 5/2001 |

* cited by examiner

Primary Examiner—Timothy P. Solak
(74) Attorney, Agent, or Firm—Rader, Fishman & Grauer PLLC

(57) ABSTRACT

An arrangement structure of a swash plate hydraulic pump which can be used in a wide range of construction equipment and industrial vehicles and is small in size, simple in structure, and inexpensive is provided. For this purpose, an arrangement structure of a swash plate hydraulic pump (1) comprises a driving source (3) and a plurality of swash plate hydraulic pumps (4, 8) which are connected to the driving source and discharge pressurized oil, and the plurality of swash plate hydraulic pumps include at least one swash plate hydraulic pump (8) of the second and subsequent swash plate hydraulic pumps which has a driving shaft (9) provided on a plane almost perpendicular to a driving shaft (6) of the first swash plate hydraulic pump (4) coupled to the driving source.

24 Claims, 11 Drawing Sheets

FIG. 10
FIG. 11
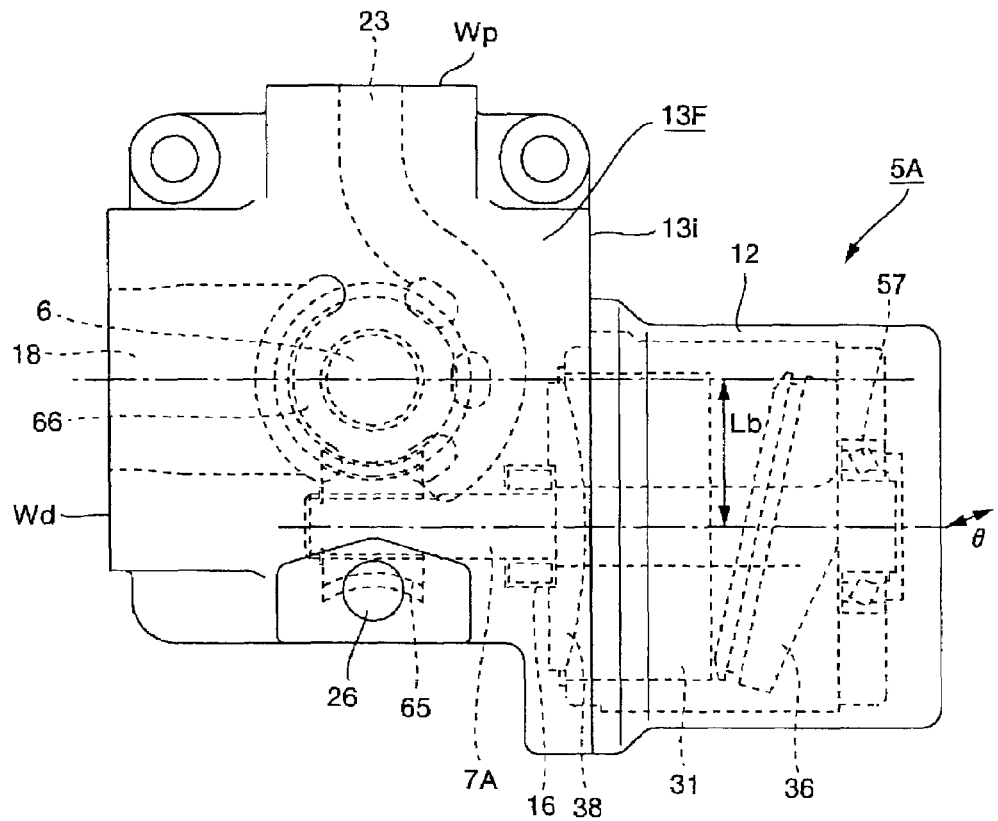
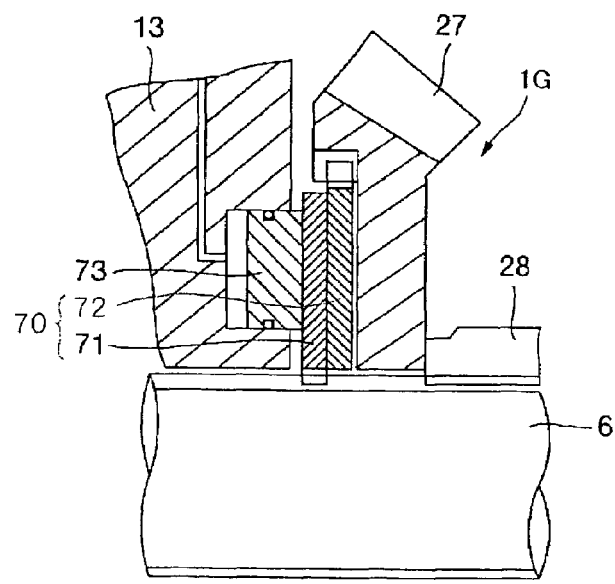

ARRANGEMENT STRUCTURE OF SWASH PLATE HYDRAULIC PUMP HYDRAULIC PUMP

TECHNICAL FIELD

The present invention relates to an arrangement structure of a swash plate hydraulic pump, and particularly relates to a structure in which a plurality of hydraulic pumps are arranged in a slash plate hydraulic pump mounted in construction equipment or an industrial vehicle and its axial overall length is short.

BACKGROUND ART

Generally, a swash plate hydraulic pump is used in many fields since its outer shape is small and control for making its discharge capacity variable is easy. Particularly, in construction equipment, an industrial vehicle, or the like, a plurality of swash plate hydraulic pumps are coupled in series (hereinafter a phrase "in tandem" is used) by making the most of their merit, and thereby used as a tandem type swash plate hydraulic pump. For example, in a hydraulic shovel, a rough terrain crane, or the like of construction equipment, a plurality of swash plate hydraulic pumps are coupled in tandem for use in an operating machine, slewing, traveling, and attachment. The swash plate hydraulic pump is provided in an engine room and attached to an engine as a driving source, and discharges pressurized oil by being directly driven to operate the operating machine and the like.

Since the swash plate hydraulic pump is provided in the engine room as described above, it is demanded that the axial overall length of the swash plate hydraulic pump is short, and as its improvement example, Japanese Patent Publication No. 3-59275, Japanese Patent Laid-open No. 8-121328, Japanese Patent Laid-open No. 2001-140748, and so on are disclosed.

In all of these Patent Bulletins, two tandem type swash plate hydraulic pumps are used, a gear case is attached to an intermediate casing provided in an intermediate portion therebetween, and a hydraulic pump is additionally provided in this gear case in parallel with the tandem type swash plate hydraulic pumps. The additionally provided hydraulic pump is formed so as to be driven by meshing a gear having a shaft parallel to the hydraulic pump with the intermediate casing or the gear case, or by a chain.

In the above, for example, according to Japanese Patent Laid-open No. 8-121328, a tandem type swash plate hydraulic pump is provided with a driving force take-out mechanism for taking out driving force in a spline sleeve member of a spline joint which is an intermediate joint portion. The driving force take-out mechanism is provided with a first gear coupled to the spline sleeve member and a gear box, and the gear box is composed of an intermediate gear and a driven gear, the spline sleeve member, and a gear case for rotatably housing these components. The gear case is removably fixed to an intermediate block of the tandem type swash plate hydraulic pump, and a pump attaching portion for attaching hydraulic pumps which may be additionally provided as necessary is provided on either side of the gear case. The additionally provided hydraulic pumps are attached in parallel to the tandem type swash plate hydraulic pump.

Thus, it is disclosed that a driving force transmission system for additionally providing one or plural hydraulic pumps and a structure related to the system can be simplified and reduced in weight, and that even one or plural hydraulic pumps are additionally provided, the tandem type swash plate hydraulic pump capable of housing them compactly without increasing the axial length of a pump unit is obtained.

In recent years, in construction equipment such as a hydraulic shovel and a rough terrain crane, a revolving superstructure is made smaller relative to a base carrier, and the revolving superstructure can revolve within the width of the base carrier. As a result, an engine room attached to the revolving superstructure becomes smaller. In the engine room, a driving source including an engine, a radiator, and the like and its related components, and hydraulic equipment such as a hydraulic pump and a direction changeover valve are housed. For example, as shown in FIG. 12, components related to the driving source including an engine 80 and a radiator 81, and a hydraulic pump 83 are provided in tandem in an engine room 84. Therefore, a hydraulic pump is additionally provided as described above without increasing the axial length of the hydraulic pump 83.

Especially, in a small-sized hydraulic shovel, the proportion of the outer shape of a revolving superstructure 87 is high relative to the crawler width of a carrier 86, and the proportion of a plane area of a driver's cab 88 to the revolving superstructure 87 is high. Accordingly, in the small-sized vehicle, in order to downsize the engine room 84, the downsizing of the engine 80 and the hydraulic pump 83 is demanded. In a large-sized vehicle, in order to drive an operating machine, a hydraulic pump with a large discharge quantity is required, and since the attachment of a plurality of hydraulic pumps becomes necessary, the downsizing of the engine 80 and the hydraulic pump 83 is demanded similarly to the small-sized vehicle.

In the aforementioned Patent Bulletins, however, the gear case which protrudes outward is attached to the intermediate casing provided between the two tandem type swash plate hydraulic pumps. Moreover, in the aforementioned Patent Bulletins, the hydraulic pump which is additionally provided in the gear case protruding outward is arranged in parallel with the tandem type swash plate hydraulic pump via the gear supported by a bearing or the chain. Since this tandem type hydraulic pump is driven via the gear or a chain, the number of components increases, and the space area and weight correspondingly increase by the gear case protruding outward and the hydraulic pump.

Furthermore, concerning the hydraulic shovel, a super-small slewing vehicle is developed, leading to the realization of the downsizing of the revolving superstructure, and it is demanded that the tendency for the revolving superstructure to be downsized is enhanced, and that a super-small slewing vehicle which has a high work rate and can be used while traffic travels on one side of the road even in the case of a large-sized vehicle capable of performing rapid construction work is developed. Hence, the downsizing of an engine room is required even in the large-sized vehicle, whereby a hydraulic pump whose axial length is short is demanded also in the two tandem type swash plate hydraulic pumps, and in addition to this, a hydraulic pump arrangement structure capable of providing three or more hydraulic pumps structured in small size as required is strongly demanded.

SUMMARY OF THE INVENTION

The present invention is made in view of the aforementioned disadvantages, and its object is to provide an arrangement structure of a swash plate hydraulic pump which can be used in a wide range of construction equipment and industrial vehicles and is small in size, simple in structure, and inexpensive.

To attain the aforementioned object, a first aspect of an arrangement structure of a swash plate hydraulic pump according to the present invention has a constitution including a driving source, and a plurality of swash plate hydraulic pumps which are connected to the driving source and discharge pressurized oil, in which the plurality of swash plate hydraulic pumps include at least one of the swash plate hydraulic pumps as second and subsequent pumps which has a driving shaft provided on a plane almost perpendicular to a driving shaft of the swash plate hydraulic pump as a first pump coupled to the driving source.

According to such a constitution, the swash plate hydraulic pump is composed of the first swash plate hydraulic pump coupled to the driving source including an engine and the like and the second hydraulic pump arranged on a plane almost perpendicular to the first swash plate hydraulic pump. Therefore, the axial length can be shortened as compared with conventional two tandem type swash plate hydraulic pumps which are coupled in tandem. Consequently, an engine room can be further downsized as compared with a prior art, whereby in both a small-sized car and a large-sized car, a revolving superstructure can be reduced in size. Moreover, third and subsequent hydraulic pumps can be attached in places in the same axial direction as the second pump and to an attaching face in positions whose orientations are different. Hence, a plurality of hydraulic sources according to an operating machine, traveling, slewing, attachment, and the like can be obtained.

A second aspect of the arrangement structure of the swash plate hydraulic pump according to the present invention has a constitution including a driving source, and a plurality of swash plate hydraulic pumps which are connected to the driving source and discharge pressurized oil, in which the plurality of swash plate hydraulic pumps include at least two of the swash plate hydraulic pumps which are coupled in tandem and at least one of the swash plate hydraulic pumps as third and subsequent pumps, which is provided between the two swash plate hydraulic pumps adjacent to each other and has a driving shaft provided on a plane almost perpendicular to driving shafts of the two swash plate hydraulic pumps.

According to such a constitution, the two swash plate hydraulic pumps coupled in tandem and the third and subsequent hydraulic pumps which are provided on an almost perpendicular plane provided between the two swash plate hydraulic pumps are provided. Thus, the axial length can be shortened as in the prior art, and since the third and subsequent hydraulic pumps are attached perpendicularly to an intermediate portion, the number of components decreases, and projections are eliminated, leading to reduction in space area and weight.

A third aspect of the arrangement structure of the swash plate hydraulic pump according to the present invention has a constitution including a driving source, and a plurality of swash plate hydraulic pumps which are connected to the driving source and discharge pressurized oil, in which the plurality of swash plate hydraulic pumps include the swash plate hydraulic pump as a first pump driven by the driving source and at least one of the swash plate hydraulic pumps as second and subsequent pumps, which is provided in a tip portion of the first swash plate hydraulic pump and has a driving shaft provided on a plane almost perpendicular to a driving shaft of the first swash plate hydraulic pump.

According to such a constitution, the second hydraulic pump, or the second hydraulic pump and the third and subsequent hydraulic pumps are attached to the tip portion of the first swash plate hydraulic pump, whereby the arrangement is made possible by exchanging end caps, and hence modifications become easy, and the structure is made simpler and more inexpensive.

A fourth aspect of the arrangement structure of the swash plate hydraulic pump according to the present invention has a constitution including a driving source, and a plurality of swash plate hydraulic pumps which are connected to the driving source and discharge pressurized oil, in which the plurality of swash plate hydraulic pumps include the swash plate hydraulic pump as a first pump driven by the driving source and at least one of the swash plate hydraulic pumps as second and subsequent pumps, which is provided between the driving source and the first swash plate hydraulic pump and has a driving shaft provided on a plane almost perpendicular to a driving shaft of the first swash plate hydraulic pump.

According to such a constitution, by providing the second hydraulic pump and the third and subsequent hydraulic pumps between the driving source and the first swash plate hydraulic pump, the weight of the second and subsequent hydraulic pumps applied to the first hydraulic pump is eliminated. Consequently, the constitution of a case of the first hydraulic pump and the like can be made simplified, and strength can be maintained against vibrations of a vehicle, impact, and the like.

Moreover, in the arrangement structure of the swash plate hydraulic pump, a constitution in which the driving shaft of the first swash plate hydraulic pump and the driving shaft of at least one of the second and subsequent swash plate hydraulic pumps, or the driving shafts of the two swash plate hydraulic pumps and the driving shaft of at least one of the third and subsequent swash plate hydraulic pumps are provided almost orthogonal to each other or are provided at a predetermined distance from each other, is also suitable.

According to such a constitution, the driving shafts of the first hydraulic pump and the second and subsequent hydraulic pumps are arranged orthogonal to each other, whereby projections of the second and subsequent hydraulic pumps can be reduced, and hence the whole size can be reduced. Further, the driving shaft of the first hydraulic pump and the driving shafts of the second and subsequent hydraulic pumps provided on a plane almost perpendicular to the driving shaft of the first hydraulic pump are provided at the predetermined distance from each other, whereby the driving shafts of the first hydraulic pump and the second and subsequent hydraulic pumps are displaced from each other, and as a result, when there is a limitation such as a wall on one side, the driving shaft can be attached in a displaced state, and hence can be used even in a small place.

Furthermore, in the arrangement structure of the swash plate hydraulic pump, a constitution in which any of a bevel gear, a worm gear, and a hypoid gear is provided or a clutch is provided between the driving shaft of the first swash plate hydraulic pump and the driving shaft of at least one of the second and subsequent swash plate hydraulic pumps or between the driving shafts of the two swash plate hydraulic pumps and the driving shaft of at least one of the third and subsequent swash plate hydraulic pumps.

According to such a constitution, the respective driving shafts of the first hydraulic pump and the second and subsequent hydraulic pumps are provided with a space therebetween by using the bevel gear, the worm gear, or the hypoid gear. Thereby, the driving shafts of the first hydraulic pump and the second and subsequent hydraulic pumps are displaced from each other, and as a result, when there is a limitation such as a wall on one side, the driving shaft can be attached in a displaced state, and hence can be used even in a small place. Moreover, the second and subsequent hydraulic pumps or the third and subsequent hydraulic pumps are driven via the clutch, and hence, when not used, the temperature of lubricating oil can be lowered, resulting in the realization of saving of energy.

BRIEF DESCRIPTION OF THE DRAWINGS

FIG. 10 is a view in the direction of the arrow 10 in FIG. 9, and a front view of the fifth tandem type swash plate hydraulic pump;

FIG. 11 is a side sectional view of a principal portion of a sixth tandem type swash plate hydraulic pump of a seventh embodiment according to the present invention.

BEST MODE FOR CARRYING OUT THE INVENTION

Figure 1:
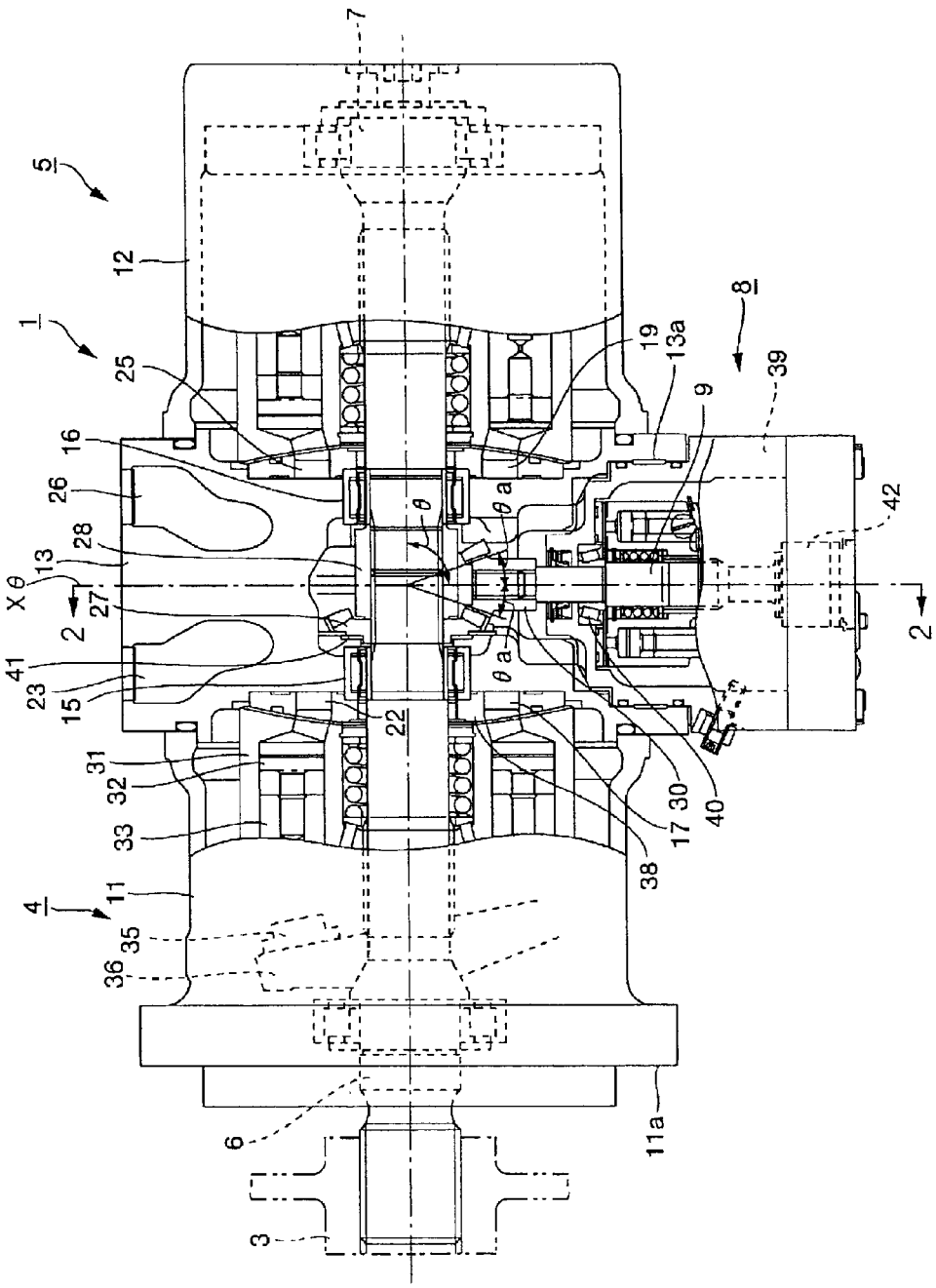
FIG. 1 is an explanatory view of an arrangement structure of a swash plate hydraulic pump of a first embodiment according to the present invention in side section.

Preferred embodiments of an arrangement structure of a swash plate hydraulic pump according to the present invention will be explained below with reference to the drawings. First, an arrangement structure of a swash plate hydraulic pump 1 of a first embodiment will be explained by means of FIG. 1 and FIG. 2. FIG. 1 is an explanatory view of the arrangement structure of the swash plate hydraulic pump of the first embodiment in side section, and FIG. 2 is a sectional view taken along the line 2—2 in FIG. 1.

Figure 2:
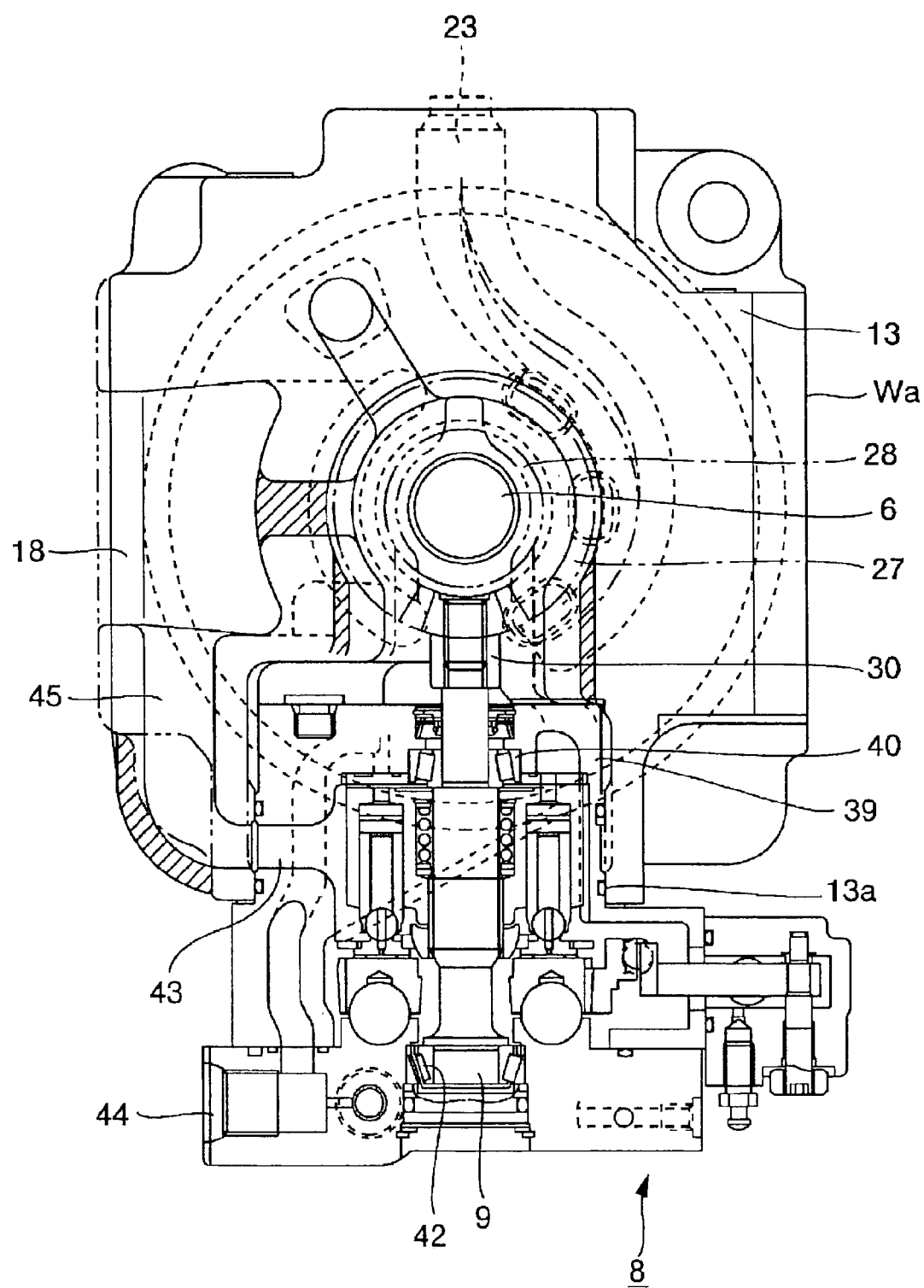
FIG. 2 is a sectional view taken along the line 2—2 in FIG. 1.

In FIG. 1 and FIG. 2, the arrangement structure of the tandem type swash plate hydraulic pump 1 includes a first swash plate hydraulic pump 4 (hereinafter referred to as the first hydraulic pump 4) which is a first pump, driven by a driving source 3 including an engine and the like, a second swash plate hydraulic pump 5 (hereinafter referred to as the second hydraulic pump 5) which is a second pump, arranged in tandem with the first hydraulic pump 4, and a third swash plate hydraulic pump 8 (hereinafter referred to as the third hydraulic pump 8) which is a third pump, arranged between the first hydraulic pump 4 and the second hydraulic pump 5 and almost perpendicular to a driving shaft 6 of the first hydraulic pump 4 and a driving shaft 7 of the second hydraulic pump 5.

In FIG. 1 and FIG. 2, a driving shaft 9 of the third hydraulic pump 8 is arranged on a plane X$\theta$ orthogonal to the driving shaft 6 of the first hydraulic pump 4 and the driving shaft 7 of the second hydraulic pump 5, but it is also possible to arrange the third hydraulic pump 8 on a plane whose tilt angle $\theta$ is within the range of about 70 degrees to 110 degrees in right and left directions. It is possible to further increase this angle, but with the increase in angle, the axial overall length of the hydraulic pump becomes longer, which result in a reduced effect, and hence the aforementioned range is preferable. For example, in the structure in which the third hydraulic pump 8 is arranged between the hydraulic pumps shown in FIG. 1 and FIG. 2, it is possible to arrange the driving shaft 9 of the third hydraulic pump 8 almost perpendicular to the driving shaft 6 of the first hydraulic pump 4 and the driving shaft 7 of the second hydraulic pump 5, that is, on a plane with a tilt angle within $\theta$ a=±20 degrees with respect to the orthogonal plane X$\theta$, but a smaller angle is preferable for a shorter overall length.

A pump case 11 of the first hydraulic pump 4 and a pump case 12 of the second hydraulic pump 5 are integrally coupled by an end cap 13. The end cap 13 supports a rear end portion of the driving shaft 6 of the first hydraulic pump 4 by a bearing 15, and supports a front end portion of the driving shaft 7 of the second hydraulic pump 5 by a bearing 16. A common suction opening 18 is provided in the end cap 13 and formed to lead to a suction port 17 of the first hydraulic pump 4 and a suction port 19 of the second hydraulic pump 5. Although the suction opening 18 is common in the aforementioned example, separate suction openings may be provided. Moreover, in the end cap 13, a discharge opening 23 leading to a discharge port 22 of the first hydraulic pump 4 and a discharge opening 26 leading to a discharge port 25 of the second hydraulic pump 5 are formed.

Inside the end cap 13, a driving side bevel gear 27 for driving the third hydraulic pump 8 is provided in the rear end portion of the driving shaft 6 of the first hydraulic pump 4. Moreover, a spline joint 28 is provided adjacent to the driving side bevel gear 27 and between the rear end portion of the driving shaft 6 of the first hydraulic pump 4 and the front end portion of the driving shaft 7 of the second hydraulic pump 5, and transmits power of the driving source 3 to the driving shaft 7 of the second hydraulic pump 5 via the driving shaft 6 of the first hydraulic pump 4 to drive the second hydraulic pump 5. In the driving shaft 9 of the third hydraulic pump 8, a driven side bevel gear 30 which meshes with the driving side bevel gear 27 is provided. The power of the driving source 3 is transmitted to the third hydraulic pump 8 via the driving shaft 6 of the first hydraulic pump 4, the driving side bevel gear 27, and the driven side bevel gear 30, so that the third hydraulic pump 8 is driven.

In FIG. 1, the first hydraulic pump 4 is provided with a cylinder block 31 which rotates integrally with the driving shaft 6 in the pump case 11, and a plurality of cylinder holes 32 are bored in the cylinder block 31. A piston 33 is slidably and closely inserted into each of the cylinder holes 32. A tip of each of the plural pistons 33 is formed spherically, and a shoe 35 is integrally coupled to the tip by being crimped. The shoe 35 slides on a plane of a rocker cam 36 which is tiltable to the pump case 11 while always being pressed against the plane, and slides circularly around a shaft center of the driving shaft 6. The rocker cam 36 changes its tilt angle with respect to the pump case 11, whereby the axial stroke of the piston 33 is made variable, and the discharge capacity of the hydraulic pump is made variable.

The cylinder block 31 rotates relatively while its side opposite to the rocker cam 36 always slides being pressed against a valve plate 38 and seals pressurized oil. In the first hydraulic pump, the plural pistons 33 reciprocate axially inside the cylinder holes 32 when the driving shaft 6 and the cylinder block 31 are rotationally driven. With the reciprocation of the pistons 33, oil sucked via the suction opening 18 and the suction port 17 is pressurized by the pistons 33 inside the cylinder holes 32 to become pressurized oil, and discharged from the discharge opening 23 via the discharge port 22.

The other structure of the first hydraulic pump 4 is well-known, and hence detailed explanation thereof is omitted. Moreover, the second hydraulic pump 5 is provided symmetrically to the first hydraulic pump 4 with respect to the end cap 13 and has the same structure as the first hydraulic pump 4, and hence the explanation thereof is omitted. Since the third hydraulic pump 8 is a swash plate hydraulic pump and has a two-stage variable discharge capacity and its structure is well-known, the explanation thereof is omitted. Although a two-stage variable displacement swash plate hydraulic pump is shown as the third hydraulic pump 8 in the aforementioned example, without being limited to this example, a fixed displacement swash plate hydraulic pump, an inclined shaft type hydraulic pump, a gear pump, a vane pump, or a trochoid pump may be used, instead.

As shown in FIG. 1 and FIG. 2, the aforementioned third hydraulic pump 8 is attached perpendicularly to the end cap 13 which is provided between the first hydraulic pump 4 and the second hydraulic pump 5. As an example, the third hydraulic pump 8 is mounted by inserting a pump case 39 into a hole 13a of the end cap 13 which is bored on the opposite side to the discharge openings 23 and 26. In the third hydraulic pump 8, the driven side bevel gear 30 is attached to an end portion of the driving shaft 9 supported by a roller bearing 40, and the driven side bevel gear 30 is arranged perpendicularly meshing with the driving side bevel gear 27 which is provided in the rear end portion of the driving shaft 6 of the first hydraulic pump 4 and supported by the bearing 15, and thus power is transmitted to the third hydraulic pump 8. On this occasion, reaction force exerted on the driving side bevel gear 27 which drives the driven side bevel gear 30 is received by the end cap 13 via a thrust bearing 41.

Force exerted on the driven side bevel gear 30 which drives the third hydraulic pump 8 is received by a conical bearing 42 which supports the driving shaft 9 of the third hydraulic pump 8. Thus, the driving side bevel gear 27 and the driven side bevel gear 30 rotate smoothly, and the use of bevel gears enables quiet rotation. The third hydraulic pump 8 is driven by transmitting the power of the driving source 3 to the driven side bevel gear 30 via the driving shaft 6 of the first hydraulic pump 4 and the driving side bevel gear 27, and the third hydraulic pump 3 makes oil sucked from a suction opening 43 pressurized oil and discharges it from a discharge opening 44. In the case of the aforementioned example, the suction opening 43 of the third hydraulic pump 3 is connected to the suction opening 18 of the first hydraulic pump 4 and the second hydraulic pump 5 by a passage 45, and the suction opening is made common with the suction opening 18 of the first hydraulic pump 4 and the second hydraulic pump 5, whereby the simplification of suction piping and the like is realized.

Incidentally, although an example, in which in the tandem type swash plate hydraulic pump 1, the third hydraulic pump 8 is arranged in a direction perpendicular to the first hydraulic pump 4 and the second hydraulic pump 5 and only the third hydraulic pump 8 is attached to the end cap 13, is shown on illustration in the aforementioned embodiment, it is possible to attach a fourth hydraulic pump 10 to a face in which the suction opening 18 and the discharge port 26 are not provided and in a position at an angle of 90 degrees (for example, a face Wa in FIG. 2) or 180 degrees with respect to the third hydraulic pump 8.

On this occasion, by using the driving side bevel gear 27 for driving the first hydraulic pump 4 by which the third hydraulic pump 8 is driven and meshing another driven side bevel gear 30 therewith, the fourth hydraulic pump 10 is driven, and the fourth hydraulic pump 10 is arranged in a direction perpendicular to the first hydraulic pump 4 and the second hydraulic pump 5. Moreover, the structure of the fourth hydraulic pump 10 can be simplified, and the cost thereof can be lowered by using the driving side bevel gear 27 in common. Furthermore, hypoid gears 27 and 30 can be used in place of the bevel gears 27 and 30.

Next, operation will be explained in the aforementioned constitution. In FIG. 1, in the swash plate hydraulic pump 1, for example, a front case portion 11a is attached directly to a case of the driving source 3 including the engine and the like, and the driving shaft 6 of the first hydraulic pump 4 is inserted into the driving source 3 including the engine and the like to receive driving source. The driving shaft 6 of the first hydraulic pump 4 rotates the cylinder block 31 of the first hydraulic pump 4, and changes the driving force of the driving source 3 perpendicularly via the driving side bevel gear 27 and the driven side bevel gear 30 which meshes therewith to rotationally drive the third hydraulic pump 8.

Moreover, at the same time, the driving shaft 6 of the first hydraulic pump 4 transmits the power of the driving source 3 to the driving shaft 7 of the second hydraulic pump 5 via the spline joint 28 to rotationally drive the second hydraulic pump 5. Thus, the first hydraulic pump 4 and the second hydraulic pump 5 suck oil from the common suction opening 18, and in the first hydraulic pump 4, the oil sucked from the suction port 17 is pressurized by the pistons 33 in the cylinder holes 32 and discharged from the discharge opening 23 via the discharge port 22. In the second hydraulic pump 5, the oil sucked from the suction opening 18 common with the first hydraulic pump 4 is pressurized similarly to the first hydraulic pump 4 and discharged from the discharge opening 26 via the discharge port 25. In the third hydraulic pump 8, the oil sucked from the suction opening 43 which is connected to the suction opening 18 of the first hydraulic pump 4 and the second hydraulic pump 5 by the passage 45 is pressurized similarly to the first hydraulic pump 4 to become pressurized oil and discharged from the discharge opening 44.

In a conventional example, a driving force transmission system for additionally providing one or plural hydraulic pumps and a structure related to the system have a gear box in an intermediate block of a tandem type swash plate hydraulic pump, a hydraulic pump is additionally provided therein, and one or plural hydraulic pumps are arranged in parallel. On the other hand, in the first embodiment of the present invention, by adopting a structure in which the third hydraulic pump 8 is attached perpendicular to the end cap 13 corresponding to the intermediate block in the conventional example, compared with the conventional example, a further reduction in size and a further reduction in cost with a simple structure become possible. Moreover, the tandem type swash plate hydraulic pump 1 capable of compactly housing hydraulic pumps without increasing the axial length, space area, and weight of a pump unit even if one or plural hydraulic pumps are added can be obtained.

Figure 3:
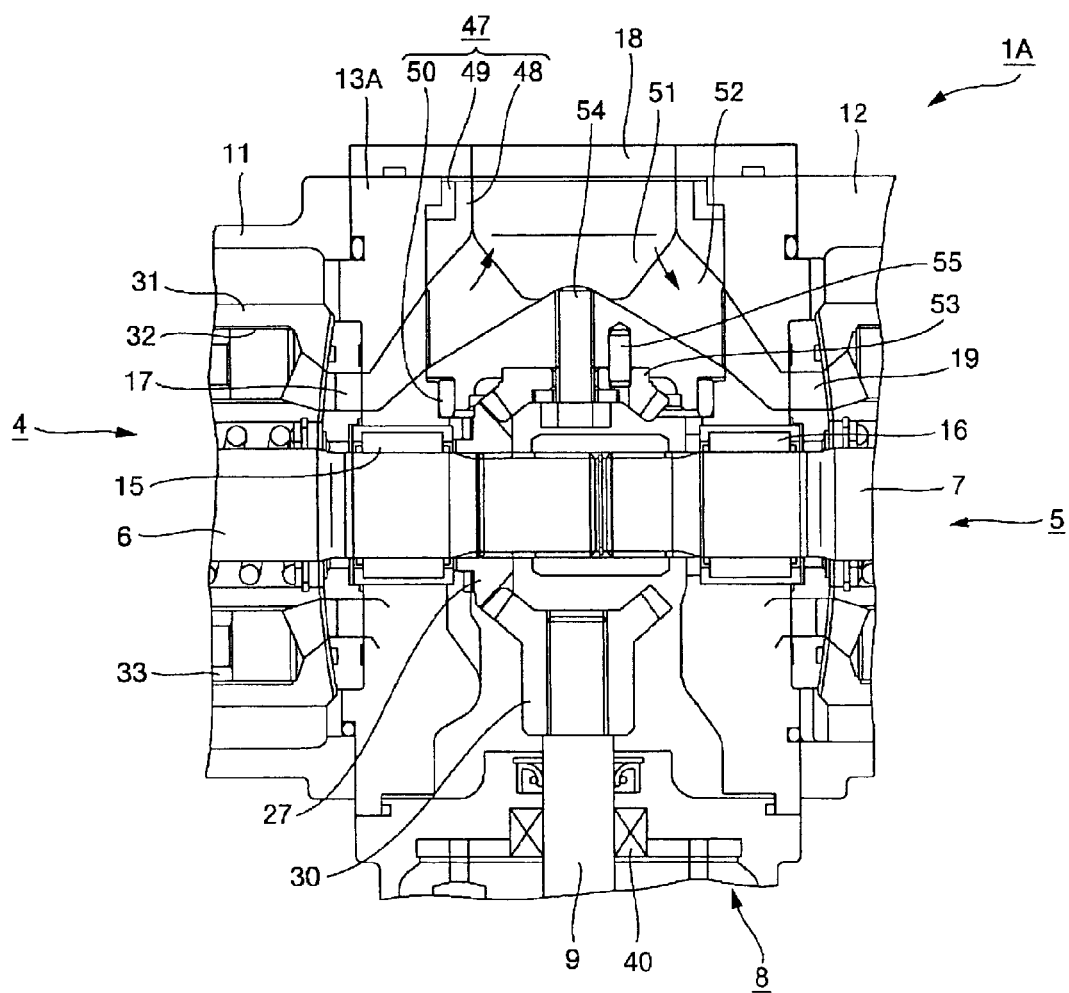
FIG. 3 is an explanatory view of a first tandem type swash plate hydraulic pump of a second embodiment according to the present invention in partial side section.

Next, a first tandem type swash plate hydraulic pump of a second embodiment will be explained be means of FIG. 3. FIG. 3 is an explanatory view of a first tandem type swash plate hydraulic pump 1A in partial side section. It should be noted that hereinafter the same numerals and symbols are given to the same components as those in the first embodiment.

The first tandem type swash plate hydraulic pump 1A of the second embodiment uses the arrangement structure of the tandem arrangement of the first hydraulic pump 4 and the second hydraulic pump 5 and the arrangement of the third hydraulic pump 8 perpendicular to the first hydraulic pump 4 and the second hydraulic pump 5 in the first embodiment without any change. In the tandem type swash plate hydraulic pump 1 of the first embodiment, the common suction opening 18 is provided in the end cap 13, and oil to the hydraulic pump 1 is sucked from the suction opening 18 via the suction opening 18 and the suction ports 17 and 19 with the reciprocation of the pistons 33. On this occasion, in order that the hydraulic pump 1 does not cause cavitation, the position of a tank is elevated or the tank is pressurized, so that suction becomes easy.

On the other hand, in the first tandem type swash plate hydraulic pump 1A, an impeller section 47 is provided between the suction opening 18 and the suction ports 17 and 19, and oil is pressurized and supplied. In the impeller section 47, an impeller 48 is formed cylindrically and supported by bearings 49 and 50 rotatably with respect to a first end cap 13A. The inside of the impeller 48 is formed by a branch passage 51 leading to the suction opening 18 and blades 52 arranged at even positions of a circumference leading to the branch passage 51. An impeller bevel gear 53 is attached to the impeller 48 with a bolt 54, and the rotation thereof is deterred by a pin 55. The impeller bevel gear 53 is provided meshing with the driving side bevel gear 27.

Incidentally, although the third hydraulic pump 8 is shown on the side opposite to the suction opening 18 in FIG. 3, similarly to FIG. 2, the third hydraulic pump 8 is arranged at an angle of 90 degrees with respect to the suction opening 18, and oil to the third hydraulic pump 8, after the impeller 48, for example, is supplied by branching off at the suction ports 17 and 19 to the first hydraulic pump 4 and the second hydraulic pump 5. Moreover, one impeller 48 supplies the oil to three of the first hydraulic pump 4, the second hydraulic pump 5, and the third hydraulic pump 8, but it is also possible to provide an impeller in each of the hydraulic pumps 4, 5, and 8 and supply oil.

Next, operation will be explained in the aforementioned constitution. In FIG. 3, the impeller bevel gear 53 which is attached to the impeller 48 rotates by receiving the power of the driving source 3 via the driving shaft 6 of the first hydraulic pump 4 and the driving side bevel gear 27. With the rotation of the impeller bevel bear 53, the impeller 48 also rotates, whereby oil in the suction opening 18 is pressurized and supplied to the suction ports 17 and 19 to the first hydraulic pump 4 and the second hydraulic pump 5. The oil in the suction opening 18 is also pressurized and supplied to the third hydraulic pump 8 by the impeller 48 as described above. Thereby, the first hydraulic pump 4, the second hydraulic pump 5, and the third hydraulic pump 8 do not cause cavitation since the oil is pressurized and supplied by the impeller 48. As a result, the position of the tank can be set without restraint, and the necessity for pressurizing the tank is eliminated, resulting in an increase in design flexibility.

Figure 4:
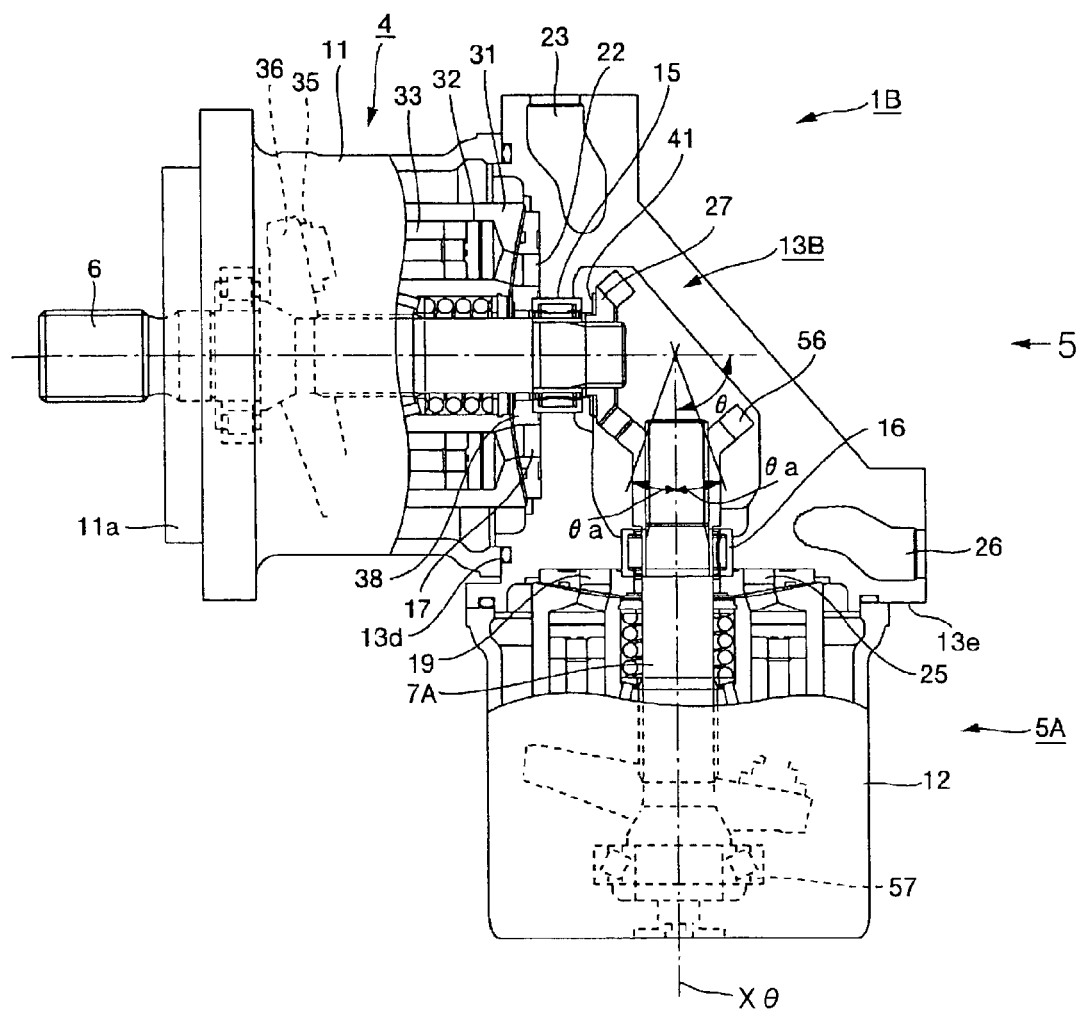
FIG. 4 is an explanatory view of a second tandem type swash plate hydraulic pump of a third embodiment according to the present invention in side section.
Figure 5:
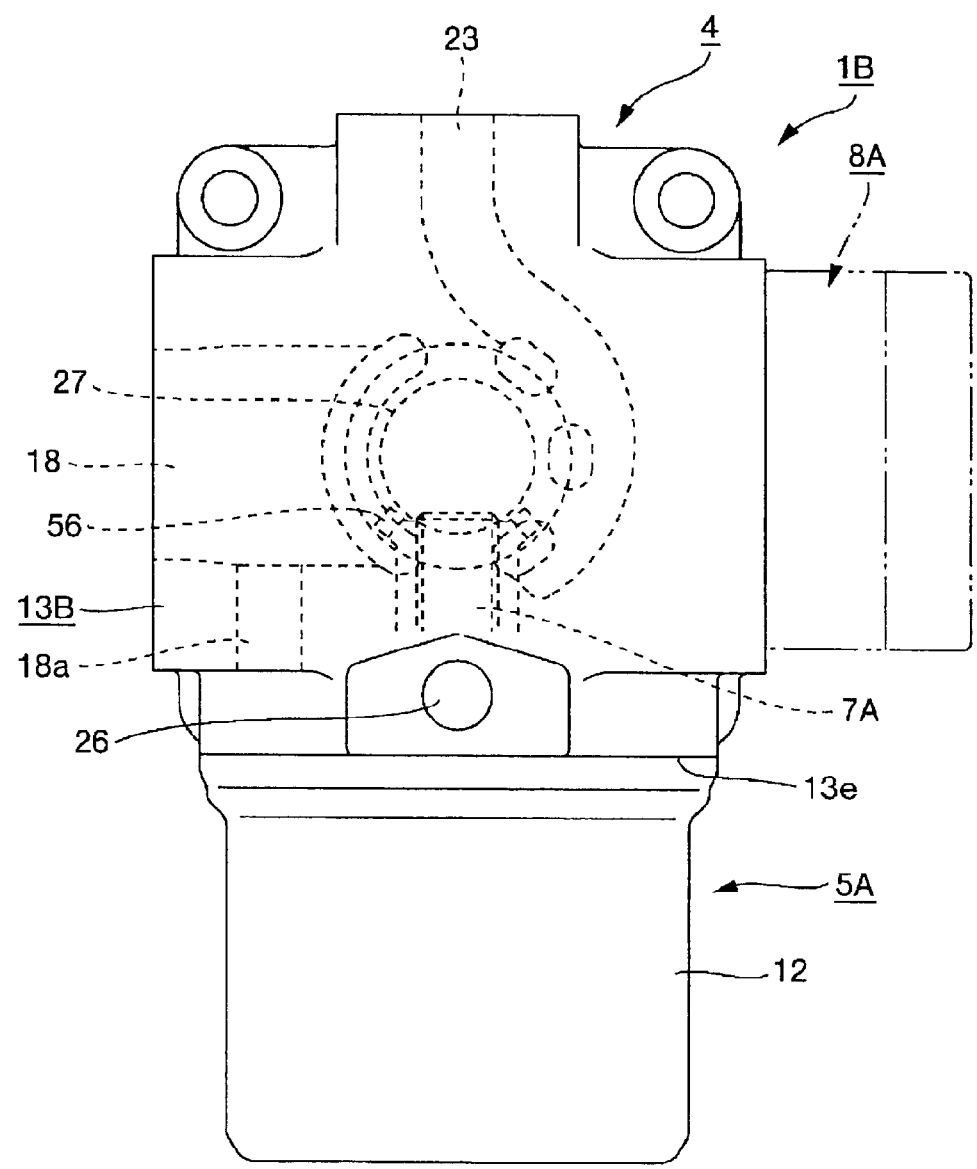
FIG. 5 is a view in the direction of the arrow 5 in FIG. 4, and a front view of the second tandem type swash plate hydraulic pump.

Next, a second tandem type swash plate hydraulic pump of a third embodiment will be explained by means of FIG. 4 and FIG. 5. FIG. 4 is an explanatory view of a second tandem type swash plate hydraulic pump 1B in side section, and FIG. 5 is a front view (a view in the direction of the arrow 5 in FIG. 4). It should be noted that hereinafter the same numerals and symbols are given to the same components as those in the first embodiment.

In the tandem type swash plate hydraulic pump 1 of the first embodiment, the first hydraulic pump 4 and the second hydraulic pump 5 as the second pump are integrally coupled in tandem by the end cap 13. On the other hand, in the second tandem type swash plate hydraulic pump 1B of the third embodiment, two swash plate hydraulic pumps are arranged almost perpendicular to each other using a second end cap 13B, the bevel gear 27 attached to the tip of the driving shaft 6, and a driven side first bevel gear 56 attached to the tip of a first driving shaft 7A. Hence, in the second tandem type wash plate type hydraulic pump 1B, an example, in which the axial length of the first hydraulic pump 4 and the second hydraulic pump 5 which are integrally coupled in tandem in the first embodiment is further shortened, is shown.

In FIG. 4 and FIG. 5, an arrangement structure of the second tandem type swash plate hydraulic pump 1B includes the first hydraulic pump 4 which is the first pump and a fifth swash plate hydraulic pump 5A (hereinafter referred to as the fifth hydraulic pump 5A) which is the second pump attached to a tip portion of the first hydraulic pump 4 and arranged almost perpendicular to the first hydraulic pump 4. Although the first driving shaft 7A of the fifth hydraulic pump 5A is arranged on the plane X$\theta$ orthogonal to the driving shaft 6 of the first hydraulic pump 4 in FIG. 4, it is also possible to arrange the fifth hydraulic pump 5A on a plane whose tilt angle $\theta$ is within the range of about 70 degrees to 110 degrees in right and left directions. For example, likewise with the first embodiment, the fifth hydraulic pump 5A can be arranged almost perpendicular to the driving shaft 6 of the first hydraulic pump 4, that is, on a plane with a tilt angle within $\theta a=\pm 20$ degrees with respect to the orthogonal plane X$\theta$.

The pump case 11 of the first hydraulic pump 4 and the pump case 12 of the fifth hydraulic pump 5A are attached to the second end cap 13B having pump attaching faces 13$d$ and 13$e$ which are formed at right angles to each other, and coupled integrally at right angles. The second end cap 13B supports the rear end portion of the driving shaft 6 of the first hydraulic pump 4 by the bearing 15, and supports a front end portion (an upper end portion in FIG. 4) of the first driving shaft 7A of the fifth hydraulic pump 5A by the bearing 16.

As shown in FIG. 5, the common suction opening 18 of the first hydraulic pump 4 and the fifth hydraulic pump 5A is formed in the second end pump 13B. The suction opening 18 leads to the suction port 17 of the first hydraulic pump 4, and a suction passage 18a which branches from the suction opening 18 leads to the suction port 19 of the fifth hydraulic pump 5A. Moreover, as shown in the second embodiment, it is also possible to provide the impeller section 47 between the suction opening 18 and the suction ports 17 and 19, pressurize oil, and supply the oil. In the second end cap 13B, the discharge opening 23 leading to the discharge port 22 of the first hydraulic pump 4 and the discharge opening 26 leading to the discharge port 25 of the fifth hydraulic pump 5A are formed. Incidentally, the suction opening 18 is common and the discharge opening 23 and the discharge opening 26 are provided on the same plane apart from each other in the aforementioned example, but without being limited to this example, a suction opening and a discharge opening can be provided in each of the hydraulic pumps.

Inside the second end cap 13B, the driving side bevel gear 27 for driving the fifth hydraulic pump 5A is provided in the rear end portion of the driving shaft 6 of the first hydraulic pump 4. Moreover, the driven side first bevel gear 56 which meshes with the driving side bevel gear 27 is provided between the rear end portion of the driving shaft 6 of the first hydraulic pump 4 and the front end portion of the first driving shaft 7A of the fifth hydraulic pump 5A. The driven side first bevel gear 56 is attached to the front end portion of the first driving shaft 7A of the fifth hydraulic pump 5A which is orthogonal to the driving shaft 6 of the first hydraulic pump 4. The power of the driving source 3 is transmitted to the fifth hydraulic pump 5A via the driving shaft 6 of the first hydraulic pump 4, the driving side bevel gear 27, and the driven side first bevel gear 56, so that the fifth hydraulic pump 5A is driven.

As shown in FIG. 4 and FIG. 5, an example, in which the fifth hydraulic pump 5A is attached to the second end cap 13B in a direction perpendicular to the first hydraulic pump 4, is shown on illustration. On this occasion, in the fifth hydraulic pump 5A, reaction force exerted on the driving side bevel gear 27 which drives the driven side first bevel gear 56 is received by the second end cap 13B via the thrust bearing 41. Force exerted on the driven side first bevel gear 56 is received by a conical bearing 57 which supports the first driving shaft 7A of the fifth hydraulic pump 5A. Thus, the driving side bevel gear 27 and the driven side first bevel gear 56 rotate smoothly, and the use of bevel gears enables quiet rotation.

Next, operation will be explained in the aforementioned constitution. In FIG. 4, in the swash plate hydraulic pump 1B, as in FIG. 1, the driving shaft 6 is inserted into the driving source 3 including the engine and the like to receive driving force. The driving shaft 6 rotates the cylinder block 31 of the first hydraulic pump 4, and changes the driving force of the driving source 3 perpendicularly via the driving side bevel gear 27 and the driven side first bevel gear 56 which meshes therewith to rotationally drive the fifth hydraulic pump 5A. Thus, the first hydraulic pump 4 and the fifth hydraulic pump 5A suck oil from the common suction opening 18, and in the first hydraulic pump 4, the oil sucked from the suction port 17 is pressurized by the pistons 33 in the cylinder holes 32 and discharged from the discharge opening 23 via the discharge port 22. In the fifth hydraulic pump 5A, the oil sucked from the suction port 19 is pressurized similarly to the first hydraulic pump 4 and discharged from the discharge opening 26 via the discharge port 25.

In the tandem type swash plate hydraulic pump 1 of the first embodiment, the first hydraulic pump 4 as the first pump and the second hydraulic pump 5 as the second pump are integrally coupled in tandem by the end cap 13. On the other hand, in the second tandem type swash plate hydraulic pump 1B of the third embodiment, an example, in which the fifth hydraulic pump 5A as the second pump is arranged almost perpendicular to the first hydraulic pump 4 as the first pump, whereby it becomes possible to shorten the axial length, is shown.

In the second tandem type swash plate hydraulic pump 1B of the third embodiment, especially in a small-sized vehicle having a driver's cab of a fixed size with respect to a crawler width of a carrier, the proportion of a revolving superstructure, particularly the area of the driver's cab therein to the carrier is high. Therefore, in the case of a super-small slewing small-sized vehicle which slews within the crawler width, a further downsized engine room is desired, and hence by arranging two swash plate hydraulic pumps almost perpendicular to each other, the axial length is shortened, thereby producing a large effect.

Figure 6:
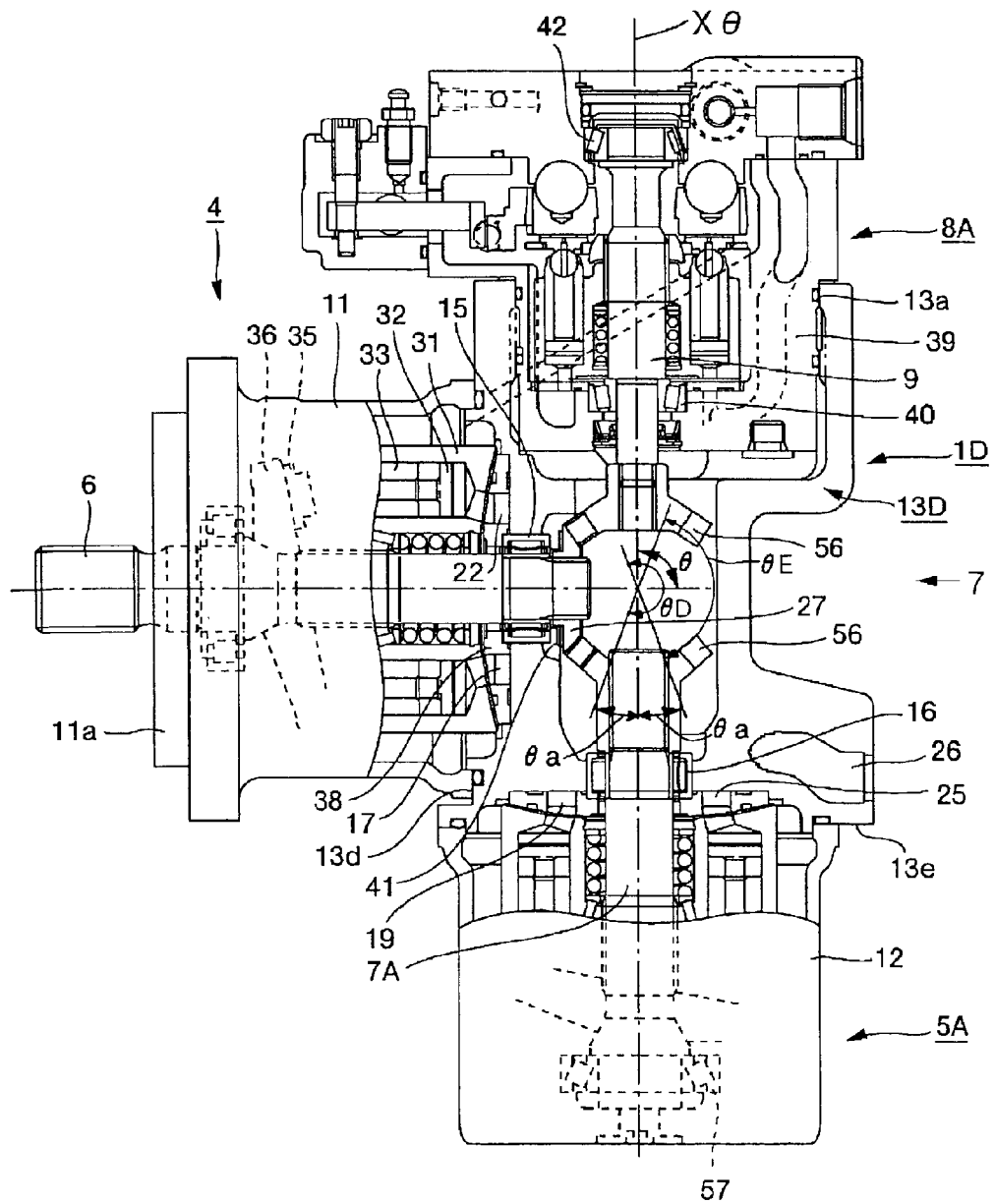
FIG. 6 is an explanatory view of a third tandem type swash plate hydraulic pump of a fourth embodiment according to the present invention in side section.
Figure 7:
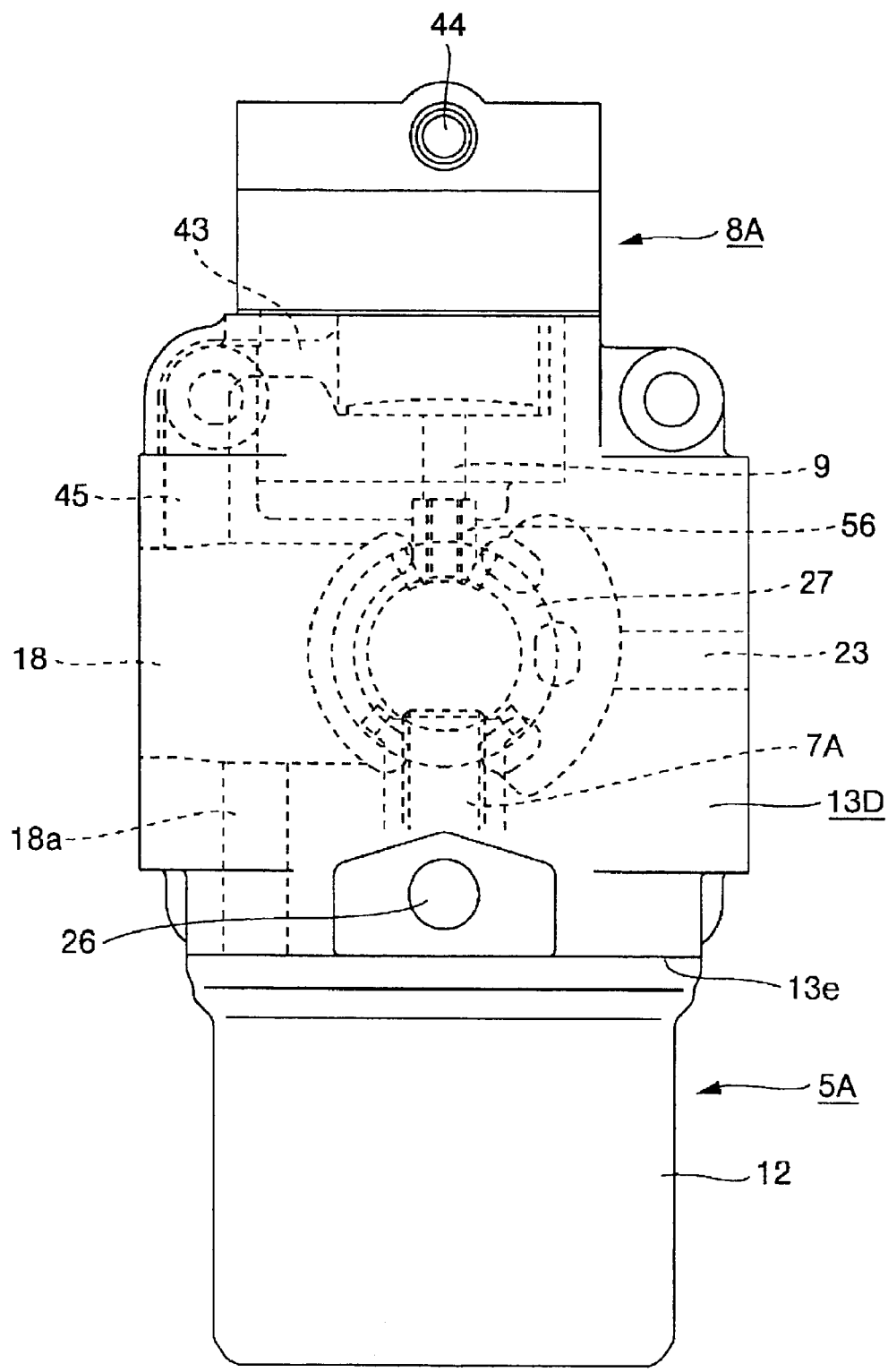
FIG. 7 is a view in the direction of the arrow 7 in FIG. 6, and a front view of the third tandem type swash plate hydraulic pump.

Next, a third tandem type swash plate hydraulic pump of a fourth embodiment will be explained by means of FIG. 6 and FIG. 7. FIG. 6 is an explanatory view of a third tandem type swash plate hydraulic pump 1D in side section, and FIG. 7 is a front view (a view in the direction of the arrow 7 in FIG. 6). It should be noted that hereinafter the same numerals and symbols are given to the same components as those in the first embodiment and the third embodiment.

In the second tandem type swash plate hydraulic pump 1B of the third embodiment, an example, in which the fifth hydraulic pump 5A as the second pump is arranged at the tip portion of the first hydraulic pump 4 while forming a right angle with the first hydraulic pump 4, whereby the axial length is further shortened, is shown. On the other hand, in the third tandem type swash plate hydraulic pump 1D of the fourth embodiment, in addition to the third embodiment, a sixth swash plate hydraulic pump 8A (hereinafter referred to as the six hydraulic pump 8A) which is the third pump arranged in the same position as the fifth hydraulic pump 5A as the second pump in the axial direction and symmetrical to the fifth hydraulic pump 5A is provided. Namely, the fifth hydraulic pump 5A and the sixth hydraulic pump 8A are attached to the tip portion of the first hydraulic pump 4 and arranged almost at right angles to the first hydraulic pump 4 as the first pump.

On this occasion, an example, in which the sixth hydraulic pump 8A as the third pump is arranged in a structure simplified by allowing the driven side first bevel gear 56 for the third pump to mesh with the driving side bevel gear 27 which meshes with the fifth hydraulic pump 5A as the second pump, and hence the axial length is shortened as in the third embodiment, and moreover the function is fulfilled by the addition of the hydraulic pump, is shown.

In FIG. 6 and FIG. 7, an arrangement structure of the third tandem type swash plate hydraulic pump 1D includes the aforementioned first hydraulic pump 4 as the first pump, and the fifth swash plate hydraulic pump 5A as the second pump and the sixth hydraulic pump 8A as the third pump which are arranged almost perpendicular to the driving shaft 6 of the first hydraulic pump 4 and symmetrical with respect to the driving shaft 6. In FIG. 6, the first driving shaft 7A of the fifth hydraulic pump 5A and the driving shaft 9 of the sixth hydraulic pump 8A are arranged on the plane X$\theta$ orthogonal to the driving shaft 6 of the first hydraulic pump 4. However, similarly to the first embodiment, the driving shafts 7A and 9 of the fifth hydraulic pump 5A and the sixth hydraulic pump 8A can be arranged almost perpendicular to the driving shaft 6 of the first hydraulic pump 4, that is, on a plane with a tilt angle within $\theta a = \pm 20$ degrees with respect to the orthogonal plane X$\theta$.

For example, both the driving shafts 7A and 9 can be set at an angle θ=−20 degrees in a clockwise direction with respect to the driving shaft 6 of the first hydraulic pump 4, namely, an inner angle θE (angle on the right side in FIG. 6) between the first driving shaft 7A of the fifth hydraulic pump 5A and the driving shaft 9 of the sixth hydraulic pump 8A can be set at an acute angle. Contrary to this, an inner angle θD (angle on the right side in FIG. 6) between the first driving shaft 7A of the fifth hydraulic pump 5A and the driving shaft 9 of the sixth hydraulic pump 8A can be set at an obtuse angle. When it is set at the obtuse angle, the tip portions of the fifth hydraulic pump 5A and the sixth hydraulic pump 8A tilt to the first hydraulic pump 4 side, whereby their attachment to a wall of an arcuate engine room or the like used in the revolving superstructure becomes easy.

The pump case 11 of the first hydraulic pump 4 and the pump case 12 of the fifth hydraulic pump 5A are attached to the third end cap 13D having the pump attaching faces 13d and 13e which are formed at right angles to each other, and are coupled integrally at right angles. The third end cap 13D supports the tip portion of the driving shaft 6 of the first hydraulic pump 4 by the bearing 15, and supports the front end portion (the upper end portion in FIG. 6) of the first driving shaft 7A of the fifth hydraulic pump 5A by the bearing 16. As shown in FIG. 6, in the sixth hydraulic pump 8A, the pump case 39 is inserted into the hole 13a bored in the third end cap 13D on the side opposite to the fifth hydraulic pump 5A attached to the third end cap 13D.

In the sixth hydraulic pump 8A, the driven side first bevel gear 56 is attached to the end portion of the driving shaft 9 supported by the roller bearing 40. The driven side first bevel gear 56 is provided in the rear end portion of the driving shaft 6 of the first hydraulic pump 4 and arranged perpendicularly meshing with the driving side bevel gear 27 supported by the bearing 15, and thereby power is transmitted. On this occasion, reaction force exerted on the driving side bevel gear 27 which drives both the driven side first bevel gears 56 of the fifth hydraulic pump 5A and the sixth hydraulic pump 8A is received by the third end cap 13D via the thrust bearing 41.

Force exerted on both the driven side first bevel gears 56 is received by the conical bearing 42 which supports the driving shaft 9 of the third hydraulic pump 8 on one hand, and by the conical bearing 57 which supports the first driving shaft 7A of the fifth hydraulic pump 5A on the other. Thus, the driving side bevel gear 27 and the driven side first bevel gears 56 rotate smoothly, and the use of bevel gears enables quiet rotation.

As shown in FIG. 7, the common suction opening 18 of the first hydraulic pump 4 and the fifth hydraulic pump 5A is formed in the third end pump 13D. The suction opening 18 leads to the suction port 17 of the first hydraulic pump 4, and the suction passage 18a which branches from the suction opening 18 leads to the suction port 19 of the fifth hydraulic pump 5A. The discharge opening 23 of the first hydraulic pump 4 is provided on the side opposite to the common suction opening 18. In the sixth hydraulic pump 8A, oil sucked from the suction opening 43 which is connected to the suction opening 18 of the first hydraulic pump 4 and the fifth hydraulic pump 5A by the passage 45 is made pressurized oil and discharged from the discharge opening 44. Moreover, as shown in the second embodiment, it is also possible to provide the impeller section 47 near the suction opening, pressurize oil, and supply the pressurized oil to the pumps.

Inside the third end cap 13D, the driving side bevel gear 27 for driving both the fifth hydraulic pump 5A and the sixth hydraulic pump 8A is provided in the rear end portion of the driving shaft 6 of the first hydraulic pump 4. The two driven side first bevel gear 56 which mesh with the driving side bevel gear 27 is provided between the rear end portion of the driving shaft 6 of the first hydraulic pump 4 and the front end portions of the first driving shaft 7A of the fifth hydraulic pump 5A and the sixth hydraulic pump 8A. The driven side first bevel gears 56 are attached to the front end portions of the first driving shaft 7A of the fifth hydraulic pump 5A which is orthogonal to the driving shaft 6 of the first hydraulic pump 4 and of the sixth hydraulic pump 8A, respectively. The power of the driving source 3 is transmitted to the fifth hydraulic pump 5A and the sixth hydraulic pump 8A via the driving shaft 6 of the first hydraulic pump 4, the driving side bevel gear 27, and the driven side first bevel gears 56, so that the fifth hydraulic pump 5A and the sixth hydraulic pump 8A are driven.

As shown in FIG. 6 and FIG. 7, an example in which the sixth hydraulic pump 8A is arranged perpendicular to the first hydraulic pump 4 and on the opposite side of the third end cap 13D to which the fifth hydraulic pump 5A is attached, that is, at an angle of 180 degrees with respect to the fifth hydraulic pump 5A is shown. However, the sixth hydraulic pump 8A as the third pump can be attached at an angle of 90 degrees with respect to the fifth hydraulic pump 5A as the second pump as shown by a chain double-dashed line in FIG. 5.

Next, operation will be explained in the aforementioned constitution. In FIG. 6, in the swash plate hydraulic pump 1D, as in FIG. 1, the driving shaft 6 is inserted into the driving source 3 including the engine and the like to receive driving force. The driving shaft 6 rotates the cylinder block 31 of the first hydraulic pump 4, and changes the driving force of the driving source 3 perpendicularly via the driving side bevel gear 27 and the two driven side first bevel gears 56 which mesh with the driving side bevel gear 27 to rotationally drive the fifth hydraulic pump 5A and the sixth hydraulic pump 8A.

Thus, the first hydraulic pump 4, the fifth hydraulic pump 5A, and the sixth hydraulic pump 8A suck oil from the common suction opening 18, and in the first hydraulic pump 4, the oil sucked from the suction port 17 is pressurized by the pistons 33 in the cylinder holes 32 and discharged from the discharge opening 23 via the discharge port 22. In the fifth hydraulic pump 5A, the oil sucked from the suction port 19 is pressurized similarly to the first hydraulic pump 4 and discharged from the discharge opening 26 via the discharge port 25. In the sixth hydraulic pump 8A, the oil sucked from the suction opening 43 which is connected to the suction opening 18 of the first hydraulic pump 4 and the fifth hydraulic pump 5A by the passage 45 is pressurized similarly to the first hydraulic pump 4 to become pressurized oil, and discharged from the discharge opening 44.

The tandem type swash plate hydraulic pump 1 of the first embodiment is formed by arranging the first hydraulic pump 4 and the second hydraulic pump 5 in tandem and arranging the third hydraulic pump 8 perpendicular to the first hydraulic pump 4 and the second hydraulic pump 8, whereby the axial length is shortened. On the other hand, in the third tandem type swash plate hydraulic pump 1D of the fourth embodiment, two of the fifth hydraulic pump 5A and the sixth hydraulic pump 8A are arranged almost perpendicular to the first hydraulic pump 4, whereby the axial length can be made shorter than that in the first embodiment. In the third tandem type swash plate hydraulic pump 1D of the fourth embodiment, similarly to the third embodiment, in the case of the super-small slewing small-sized vehicle which slews within the crawler width, a further downsized engine room is obtained, and hence the axial length is shortened, thereby producing a large effect.

Figure 8:
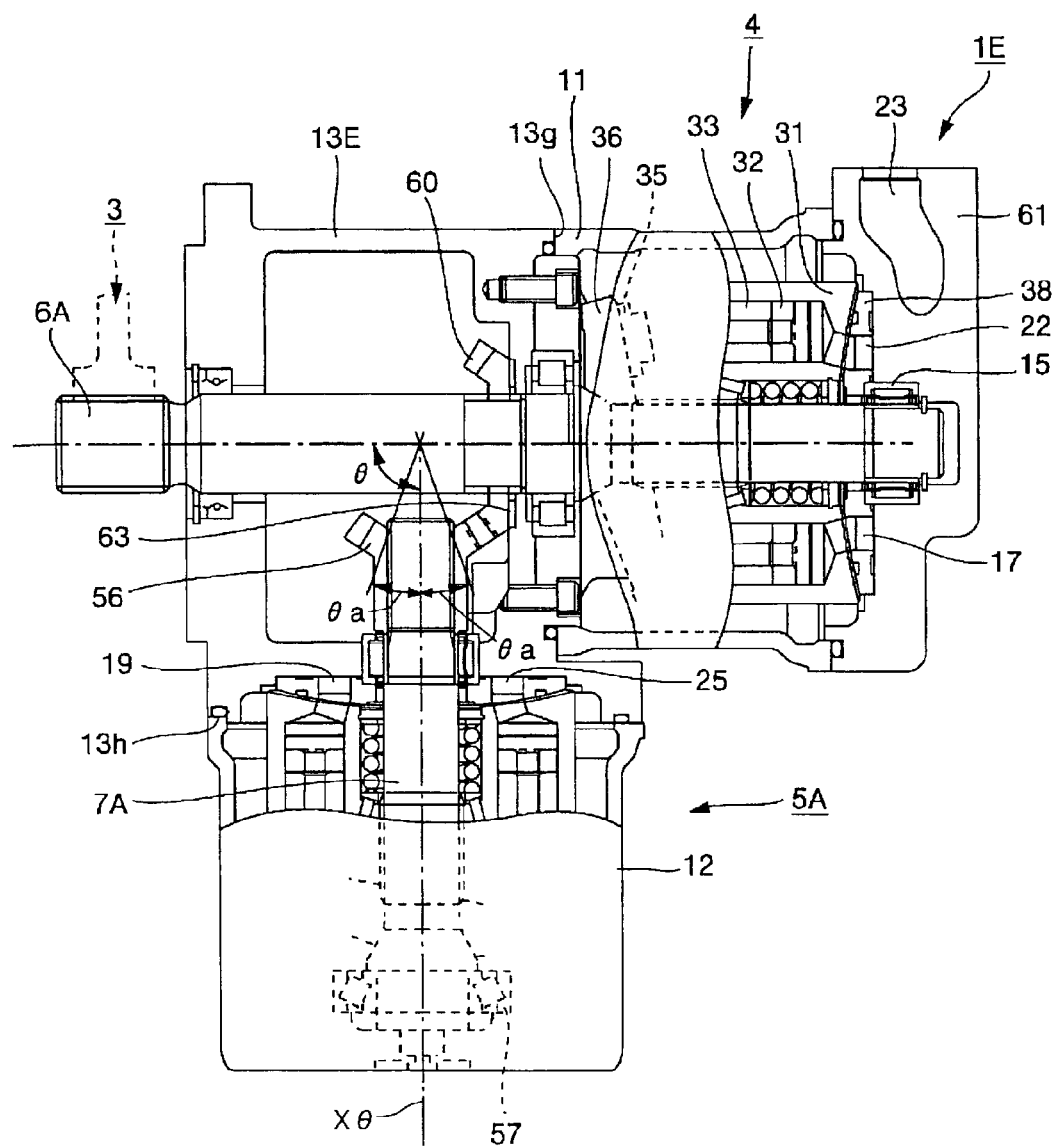
FIG. 8 is an explanatory view of a fourth tandem type swash plate hydraulic pump of a fifth embodiment according to the present invention in side section.

Next, a fourth tandem type swash plate hydraulic pump of a fifth embodiment will be explained by means of FIG. 8. FIG. 8 is an explanatory view of a fourth tandem type swash plate hydraulic pump 1E in side section. It should be noted that hereinafter the same numerals and symbols are given to the same components as those in the first embodiment, the third embodiment, and the fourth embodiment. The fourth tandem type swash plate hydraulic pump 1E of the fifth embodiment is composed of two tandem type swash plate hydraulic pumps which are arranged at right angles similarly to the second tandem type swash plate hydraulic pump 1B of the third embodiment.

In the second tandem type swash plate hydraulic pump 1B of the third embodiment, there is provided the second hydraulic pump 5 as the second pump which is attached to the side of the tip of the first hydraulic pump 4 as the first pump and arranged almost perpendicular to the first hydraulic pump 4. On the other hand, in the fourth tandem type swash plate hydraulic pump 1E of the fifth embodiment, there is provided the fifth hydraulic pump 5A as the second pump which is attached to the front end side of the first hydraulic pump 4 and arranged almost perpendicular to the first hydraulic pump 4.

Namely, the forth tandem type swash plate hydraulic pump 1E has a structure in which two swash plate hydraulic pumps are arranged almost at right angles to each other by using a fourth end cap 13E, a driving first bevel gear 60, and the driven side first bevel gear 56. In the fourth tandem type swash plate hydraulic pump 1E, an example, in which the axial length of the first hydraulic pump 4 and the second hydraulic pump 5 which are integrally coupled in tandem shown in the first embodiment is further shortened by this structure, is shown.

In FIG. 8, an arrangement structure of the fourth tandem type swash plate hydraulic pump 1E includes the fifth hydraulic pump 5A as the second pump arranged between the driving source 3 and the first hydraulic pump 4 and almost perpendicular to a first driving shaft 6A of the first hydraulic pump 4. The first driving shaft 7A of the fifth hydraulic pump 5A is arranged on the plane Xθ orthogonal to the first driving shaft 6A of the first hydraulic pump 4, but similarly to the first embodiment, it can be arranged almost perpendicular to the first driving shaft 6A of the first hydraulic pump 4, that is, on a plane with a tilt angle within θa=±20 degrees with respect to the orthogonal plane Xθ.

The pump case 11 of the first hydraulic pump 4 and the pump case 12 of the fifth hydraulic pump 5A are attached to the fourth end cap 13E having pump attaching faces 13g and 13h which are formed at right angles to each other, and coupled integrally at right angles. In the fourth end cap 13E, the first hydraulic pump 4 is attached to the pump attaching face 13g, and the fifth hydraulic pump 5A is attached to the pump attaching face 13h. In FIG. 8, in the first hydraulic pump 4, the suction opening 18 which is not shown but leads to the suction ports 17 and 19 as in FIG. 5 is provided in the fourth end cap 13E. It is also possible to provide the impeller section 47 near the suction opening to pressurize and supply oil.

The discharge opening 23 which leads to the discharge port 22 of the first hydraulic pump 4 is provided in an end cover 61. In the fourth end cap 13E, a discharge opening (not shown) similar to the discharge opening 26 in FIG. 5, which leads to the discharge port 25 of the fifth hydraulic pump 5A, is formed. Incidentally, although the valve plate 38 is provided on the right side in FIG. 8 in the first hydraulic pump 4 similarly to the first embodiment, it is also possible to reverse the valve plate 38 and provide it on the fourth end cap 13E side in the same manner as the second hydraulic pump 5, and to provide the suction opening 18 and discharge openings 23 and 26 of the first hydraulic pump 4 and the fifth hydraulic pump 5A.

Inside the fourth end cap 13E, the driving first bevel gear 60 for driving the fifth hydraulic pump 5A is provided in an intermediate portion of the first driving shaft 6A of the first hydraulic pump 4. The driven side first bevel gear 56 which meshes with the driving first bevel gear 60 is provided between the intermediate portion of the first driving shaft 6A of the first hydraulic pump 4 and the front end portion of the first driving shaft 7A of the fifth hydraulic pump 5A. The driven side first bevel gear 56 is attached to the front end portion of the first driving shaft 7A of the fifth hydraulic pump 5A orthogonal to the first driving shaft 6A of the first hydraulic pump 4. The power of the driving source 3 is transmitted to the fifth hydraulic pump 5A via the first driving shaft 6A of the first hydraulic pump 4, the driving first bevel gear 60, and the driven side first bevel gear 56, so that the fifth hydraulic pump 5A is driven.

As shown in FIG. 8, an example, in which the fifth hydraulic pump 5A is attached to the forth end cap 13 E in a direction perpendicular to the first hydraulic pump 4, is shown on illustration. On this occasion, in the fifth hydraulic pump 5A, reaction force exerted on the driving first bevel gear 60 which drives the driven side first bevel gear 56 is received by the fourth end cap 13E via the first thrust bearing 63. Force exerted on the driven side first bevel gear 56 is received by the conical bearing 57 which supports the first driving shaft 7A of the fifth hydraulic pump 5A. Thus, the driving first bevel gear 60 and the driven side first bevel gear 56 rotate smoothly, and the use of bevel gears enables quiet rotation.

Next, operation will be explained in the aforementioned constitution. In FIG. 8, in the swash plate hydraulic pump 1E, for example, the fourth end cap 13E is attached directly to the case of the driving source 3 including the engine and the like, and as in FIG. 1, the first driving shaft 6A is inserted into the driving source 3 including the engine and the like to receive driving force. The first driving shaft 6A rotates the cylinder block 31 of the first hydraulic pump 4, and changes the driving force of the driving source 3 perpendicularly via the driving first bevel gear 60 and the driven side first bevel gear 56 which meshes therewith to rotationally drive the fifth hydraulic pump 5A.

Thus, the first hydraulic pump 4 sucks oil from the suction opening provided in the fourth end cap 13E, and in the first hydraulic pump 4, the oil sucked from the suction port 17 is pressurized by the pistons 33 in the cylinder holes 32 and discharged from the discharge opening 23 provided by the end cover 61 via the discharge port 22. In the fifth hydraulic pump 5A, the oil sucked from the suction port 19 is pressurized similarly to the first hydraulic pump 4 and discharged from the discharge opening 26 via the discharge port 25.

Incidentally, in the aforementioned fifth embodiment, the structure in which only the fifth hydraulic pump 5A as the second pump is arranged orthogonal to the first hydraulic pump 4 is shown. However, as shown in FIG. 6 and FIG. 7, a structure in which the sixth hydraulic pump 8A as the third pump is arranged perpendicular to the first hydraulic pump 4 and on the opposite side of the fourth end cap 13E to which the fifth hydraulic pump 5A is attached, that is, at an angle of 180 degrees with respect to the fifth hydraulic pump 5A is also possible. Alternatively, the sixth hydraulic pump 8A as the third pump can be attached at an angle of 90 degrees with respect to the fifth hydraulic pump 5A as the second pump as shown by the chain double-dashed line in FIG. 5.

In the fifth embodiment, a structure, in which the fourth end cap 13E is provided between the driving source 3 and the first hydraulic pump 4, and the first hydraulic pump 4 as the first pump, the fifth hydraulic pump 5A as the second pump, and the sixth hydraulic pump 8A as the third pump 143 are attached respectively to the fourth end cap 13E, is also suitable. On this occasion, the action of the weight of the fifth hydraulic pump 5A and the sixth hydraulic pump 8A upon the first hydraulic pump 4 as the first pump is eliminated, whereby the strength can be maintained against vibrations of a vehicle and impact, and moreover, since the swash plate hydraulic pumps are attached at right angles in the same manner as described above, the effect of shortening the axial length is obtained.

Figure 9:
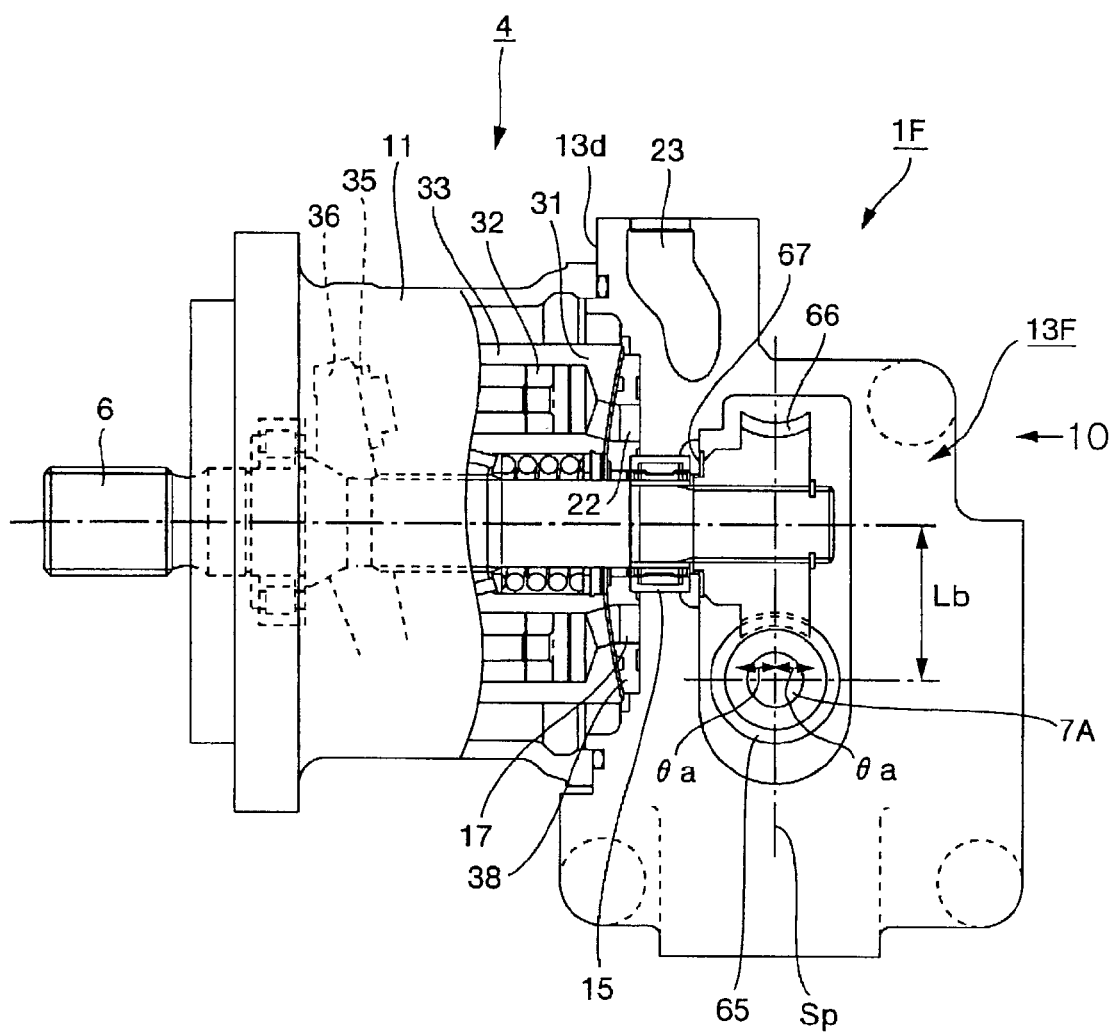
FIG. 9 is an explanatory view of a fifth tandem type swash plate hydraulic pump of a sixth embodiment according to the present invention in side section.
Figure 12:
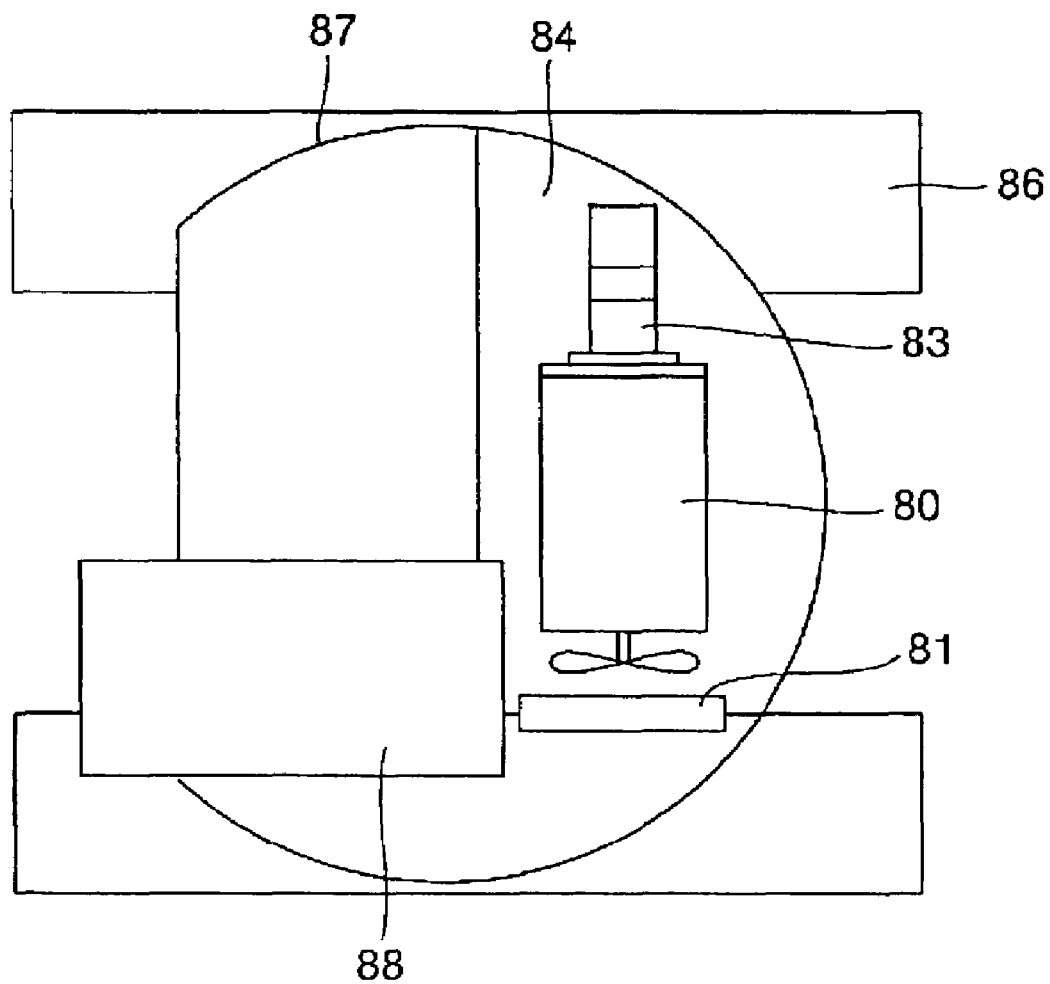
FIG. 12 is an explanatory view of a revolving superstructure of a hydraulic shovel according to a prior art in plan view.

Next, a fifth tandem type swash plate hydraulic pump of a sixth embodiment will be explained by means of FIG. 9 and FIG. 10. FIG. 9 is an explanatory view of a fifth tandem type swash plate hydraulic pump 1F in side section, and FIG. 10 is a front view (a view in the direction of the arrow 10 in FIG. 9). It should be noted that hereinafter the same numerals and symbols are given to the same components as those in the first embodiment, the third embodiment, and the fourth embodiment. Although an example of the structure in which a plurality of hydraulic pumps are arranged orthogonal to each other by using bevel gears is shown in the first to fifth embodiments, a structure in which the driving shafts of a hydraulic pump as the first pump and hydraulic pumps as the second and subsequent pump are arranged at a predetermined distance from each other by a worm gear and arranged on planes intersecting at right angles is shown in the sixth embodiment.

For example, as shown in FIG. 4 and FIG. 5, the second tandem type swash plate hydraulic pump 1B of the third embodiment has the structure in which, by the bevel gears 27 and 56, the fifth hydraulic pump 5A as the second pump is arranged almost at right angles to the first hydraulic pump 4 and the driving shafts 6 and 7A are arranged orthogonal to each other on the same plane. On the other hand, as shown in FIG. 9 and FIG. 10, the fifth tandem type swash plate hydraulic pump 1F of the sixth embodiment has a structure in which, by a worm 65 and a worm gear 66, the fifth hydraulic pump 5A as the second pump is arranged almost at right angles to the first hydraulic pump 4 and the driving shafts 6 and 7A are arranged orthogonal to each other at a predetermined distance Lb from each other.

In FIG. 9 and FIG. 10, the first driving shaft 7A of the fifth hydraulic pump 5A is arranged on a plane (on Sp) intersecting the driving shaft 6 of the first hydraulic pump 4 in a position at the predetermined distance Lb from the driving shaft 6 of the first hydraulic pump 4. However, not being limited to this arrangement, as in the case where the bevel gears is used, the first driving shaft 7A of the fifth hydraulic pump 5A can be also arranged on a plane whose angle θ is within the range of about 70 degrees to 110 degrees in right and left directions shown in FIG. 9 with respect to an intersecting plane. Namely, the first driving shaft 7A of the fifth hydraulic pump 5A can be arranged almost perpendicular to the driving shaft 6 of the first hydraulic pump 4, that is, on a plane with a tilt angle within θa=±20 in right and left directions with respect to the orthogonal plane (Sp) as shown by the arrow θa in FIG. 9. In other words, it can be arranged with a nip angle between the worm 65 and the worm gear 66 within θa=±20.

The pump case 11 of the first hydraulic pump 4 and the pump case 12 of the fifth hydraulic pump 5A are attached to a fifth end cap 13F having pump attaching faces 13d and 13i which are formed at right angles to each other, and coupled integrally at right angles. In the fifth end cap 13F, the rear end portion of the driving shaft 6 of the first hydraulic pump 4 is supported by the bearing 15, and an intermediate portion (shown in FIG. 10) of the first driving shaft 7A of the fifth hydraulic pump 5A is supported by the bearing 16. As shown in FIG. 10, in the fifth hydraulic pump 5A, the first driving shaft 7A is arranged horizontally in a position at the predetermined distance Lb from the first hydraulic pump 4 in a downward direction in FIG. 10, and attached to the pump attaching face 13i of the fifth end cap 13F.

As shown in FIG. 10, in the fifth end cap 13F, the suction opening 18 which leads to the suction port 17 of the first hydraulic pump 4 is formed. The suction opening 18 is formed so as to lead the suction port 19 of the fifth hydraulic pump 5A as in the third embodiment. The discharge opening 23 of the first hydraulic pump 4 is provided in an upper face Wp formed at right angles to a side face Wd in which the suction opening 18 is provided. In the fifth hydraulic pump 5A, oil sucked from the suction port 19 is pressurized likewise with the first hydraulic pump 4 and discharged from the discharge opening 26 via the discharge port 25. Moreover, as shown in the second embodiment, the impeller section 47 may be provided between the suction opening 18 and the suction ports 17 and 19 to pressurize oil and supply it. Incidentally, in the aforementioned example, the suction opening 18 is common, but without being limited to this example, a suction opening and a discharge opening can be provided in each of the hydraulic pumps.

Inside the fifth end cap 13F, the worm gear 66 for driving the fifth hydraulic pump 5A is provided in the rear end portion of the driving shaft 6 of the first hydraulic pump 4. The worm 65 which receives the driving force of the driving source 3 is provided in a left end portion (shown in FIG. 10) of the first driving shaft 7A of the fifth hydraulic pump 5A. The worm 65 and the worm gear 66 are provided between the rear end portion of the driving shaft 6 of the first hydraulic pump 4 and the left end portion of the first driving shaft 7A of the fifth hydraulic pump 5A, and the driving force of the driving source 3 is transmitted, via the driving shaft 6 of the first hydraulic pump 4 and the worm gear 66, to the worm 65 which meshes therewith.

The power of the driving source 3 is transmitted to the fifth hydraulic pump 5A via the driving shaft 6 of the first hydraulic pump 4, the worm gear 66, and the worm 65, so that the fifth hydraulic pump 5A is driven. In the fifth hydraulic pump 5A, reaction force exerted on the worm gear 66 which drives the worm 65 is received by the fifth end cap 13F via a second thrust bearing 67. Force exerted on the worm 65 is received by the conical bearing 57 which supports the first driving shaft 7A of the fifth hydraulic pump 5A. Thus, the worm 65 and the worm gear 66 rotate smoothly.

As for the fifth hydraulic pump 5A, as shown in FIG. 9 and FIG. 10, an example, in which the first driving shaft 7A is arranged horizontally in a position at the predetermined distance Lb from the first hydraulic pump 4 in the downward direction, and the fifth hydraulic pump 5A is attached to the pump attaching face 13i of the fifth end cap 13F on the right side shown in FIG. 10, is shown. As another example, in the fifth tandem type swash plate hydraulic pump 1F, the sixth hydraulic pump 8A as the third pump can be attached to a face opposite to the pump attaching face 13i of the fifth end cap 13F to which the fifth hydraulic pump 5A, that is, at an angle of 180 degrees with respect to the fifth hydraulic pump 5A.

Next, operation will be explained next in the aforementioned constitution. In FIG. 9 and FIG. 10, in the fifth tandem type swash plate hydraulic pump 1F, as in FIG. 1, the driving shaft 6 is inserted into the driving source 3 including the engine and the like to receive driving force. The driving shaft 6 rotates the cylinder block 31 of the first hydraulic pump 4, and changes the driving force of the driving source 3 perpendicularly via the worm 66 and the worm gear 66 which meshes therewith to rotationally drive the fifth hydraulic pump 5A. Thus, the first hydraulic pump 4 and the fifth hydraulic pump 5A suck oil from the common suction opening 18, and in the first hydraulic pump 4, the oil sucked from the suction port 17 is pressurized by the pistons 33 in the cylinder holes 32 and discharged from the discharge opening 23 via the discharge port 22. In the fifth hydraulic pump 5A, the oil sucked from the suction port 19 is pressurized similarly to the first hydraulic pump 4 and discharged from the discharge opening 26 via the discharge port 25.

Since the first driving shaft 7A is arranged horizontally in a position at the predetermined distance Lb from the first hydraulic pump 4 in the downward direction in the fifth tandem type swash plate hydraulic pump 1F of the sixth embodiment, the driving shafts 6 and 7A of the first hydraulic pump 4 as the first pump and the fifth hydraulic pump 5A as the second pump are displaced from each other. Therefore, when there is a limitation such as a wall or the like on one side in the revolving superstructure or the like, the fifth tandem type swash plate hydraulic pump 1F can be used even in a narrow place by providing the fifth hydraulic pump 5A on the side opposite to the wall or the like. Moreover, in the sixth embodiment, the worm and worm gear 65 and 66 are used in place of bevel gears, but hypoid gears also can be used.

Next, a sixth tandem type swash plate hydraulic pump of a seventh embodiment will be explained by means of FIG. 11. FIG. 11 is a side sectional view of a principal portion of a sixth tandem type swash plate hydraulic pump 1G. It should be noted that hereinafter the same numerals and symbols are given to the same components as those in the first embodiment. In the first embodiment, the reaction force of the driving side bevel gear 27 is received via the thrust bearing 41.

On the other hand, in the sixth tandem type swash plate hydraulic pump 1G of the seventh embodiment, a portion corresponding to the thrust bearing 41 in the first embodiment is operated as a clutch section 70, and when the transmission of power is desired, the clutch discs 71 and 72 are pressed by a clutch piston 73, and thereby the power of the driving shaft 6 is transmitted to the driving side bevel gear 27 via the clutch section 70 to rotationally drive the driven side bevel gear 30. Hence, the third hydraulic pump 8 is rotationally driven when necessary and discharges operating pressurized oil, and when not necessary, it stops its rotation to prevent the circulation of the operating oil, whereby a rise in oil temperature is hindered, and saving of energy can be realized. Especially, a large effect can be obtained in large-sized construction equipment.

What is claimed is:

1. An arrangement structure of a swash plate hydraulic pump, comprising:
    a driving source;
    an end cap defining a common suction opening; and
    a plurality of swash plate hydraulic pumps which are connected to said driving source and discharge pressurized oil, each swash plate hydraulic pump having a suction port, each one of the plurality of swash plate hydraulic pumps being fixedly connected to the end cap,
    wherein said plurality of swash plate hydraulic pumps include at least one of said swash plate hydraulic pumps as second and subsequent pumps which has a driving shaft provided on a plane substantially perpendicular to a driving shaft of said swash plate hydraulic pump as a first pump coupled to said driving source and each suction port of a respective one of the plurality of the swash plate hydraulic pumps is connected to the common suction opening.

2. The arrangement structure of the swash plate hydraulic pump according to claim 1,
    wherein said driving shaft of said first swash plate hydraulic pump and said driving shaft of at least one of said second and subsequent swash plate hydraulic pumps are provided substantially orthogonal to each other.

3. The arrangement structure of the swash plate hydraulic pump according to claim 1,
    wherein said driving shaft of said first swash plate hydraulic pump and said driving shaft of at least one of said second and subsequent swash plate hydraulic pumps are provided at a predetermined distance from each other.

4. The arrangement structure of the swash plate hydraulic pump according to claim 1,
    wherein any of a bevel gear, a worm gear, and a hypoid gear is provided between said driving shaft of said first swash plate hydraulic pump and said driving shaft of at least one of said second and subsequent swash plate hydraulic pumps.

5. The arrangement structure of the swash plate hydraulic pump according to claim 1,
    wherein a clutch is provided between said driving shaft of said first swash plate hydraulic pump and said driving shaft of at least one of said second and subsequent swash plate hydraulic pumps.

6. The arrangement structure of the swash plate hydraulic pump according to claim 1, wherein the end cap is a unitary construction.

7. An arrangement structure of a swash plate hydraulic pump, comprising:
    a driving source;
    an end cap defining a common suction opening; and
    a plurality of swash plate hydraulic pumps which are connected to said driving source and discharge pressurized oil, each swash plate hydraulic pump having a suction port, each one of the plurality of swash plate hydraulic pumps being fixedly connected to the end cap,
    wherein said plurality of swash plate hydraulic pumps include:
    at least two of said swash plate hydraulic pumps which are coupled in tandem; and
    at least one of said swash plate hydraulic pumps as third and subsequent pumps, which is provided between said two swash plate hydraulic pumps adjacent to each other and has a driving shaft provided on a plane substantially perpendicular to driving shafts of said two swash plate hydraulic pumps and each suction port of a respective one of the plurality of the swash plate hydraulic pumps is connected to the common suction opening.

8. The arrangement structure of the swash plate hydraulic pump according to claim 7,
wherein said driving shafts of said two swash plate hydraulic pumps and said driving shaft of at least one of said third and subsequent swash plate hydraulic pumps are provided substantially orthogonal to each other.

9. The arrangement structure of the swash plate hydraulic pump according to claim 7,
wherein said driving shafts of said two swash plate hydraulic pumps and said driving shaft of at least one of said third and subsequent swash plate hydraulic pumps are provided at a predetermined distance from each other.

10. The arrangement structure of the swash plate hydraulic pump according to claim 7,
wherein any of a bevel gear, a worm gear, and a hypoid gear is provided between said driving shafts of said two swash plate hydraulic pumps and said driving shaft of at least one of said third and subsequent swash plate hydraulic pumps.

11. The arrangement structure of the swash plate hydraulic pump according to claim 7,
wherein a clutch is provided between said driving shafts of said two swash plate hydraulic pumps and said driving shaft of at least one of said third and subsequent swash plate hydraulic pumps.

12. The arrangement structure of the swash plate hydraulic pump according to claim 7, wherein the end cap is a unitary construction.

13. An arrangement structure of a swash plate hydraulic pump, comprising:
a driving source;
an end cap defining a common suction opening; and
a plurality of swash plate hydraulic pumps which are connected to said driving source and discharge pressurized oil, each swash plate hydraulic pump having a suction port, each one of the plurality of swash plate hydraulic pumps being fixedly connected to the end cap,
wherein said plurality of swash plate hydraulic pumps include:
said swash plate hydraulic pump as a first pump driven by said driving source; and
at least one of said swash plate hydraulic pumps as second and subsequent pumps, which has a driving shaft provided on a plane substantially perpendicular to a driving shaft of said first swash plate hydraulic pump with respective tips of the respective driving shafts being rotatably connected together and each suction port of a respective one of the plurality of the swash plate hydraulic pumps is connected to the common suction opening.

14. The arrangement structure of the swash plate hydraulic pump according to claim 13,
wherein said driving shaft of said first swash plate hydraulic pump and said driving shaft of at least one of said second and subsequent swash plate hydraulic pumps are provided substantially orthogonal to each other.

15. The arrangement structure of the swash plate hydraulic pump according to claim 13,
wherein said driving shaft of said first swash plate hydraulic pump and said driving shaft of at least one of said second and subsequent swash plate hydraulic pumps are provided at a predetermined distance from each other.

16. The arrangement structure of the swash plate hydraulic pump according to claim 13,
wherein any of a bevel gear, a worm gear, and a hypoid gear is provided between said driving shaft of said first swash plate hydraulic pump and said driving shaft of at least one of said second and subsequent swash plate hydraulic pumps.

17. The arrangement structure of the swash plate hydraulic pump according to claim 13,
wherein a clutch is provided between said driving shaft of said first swash plate hydraulic pump and said driving shaft of at least one of said second and subsequent swash plate hydraulic pumps.

18. The arrangement structure of the swash plate hydraulic pump according to claim 13, wherein the end cap is a unitary construction.

19. An arrangement structure of a swash plate hydraulic pump, comprising:
a driving source;
an end cap defining a common suction opening; and
a plurality of swash plate hydraulic pumps which are connected to said driving source and discharge pressurized oil, each swash plate hydraulic pump having a suction port, each one of the plurality of swash plate hydraulic pumps being fixedly connected to the end cap,
wherein said plurality of swash plate hydraulic pumps include:
said swash plate hydraulic pump as a first pump driven by said driving source; and
at least one of said swash plate hydraulic pumps as second and subsequent pumps, which is provided between said driving source and said first swash plate hydraulic pump and has a driving shaft provided on a plane substantially perpendicular to a driving shaft of said first swash plate hydraulic pump and each suction port of a respective one of the plurality of the swash plate hydraulic pumps is connected to the common suction opening.

20. The arrangement structure of the swash plate hydraulic pump according to claim 19,
wherein said driving shaft of said first swash plate hydraulic pump and said driving shaft of at least one of said second and subsequent swash plate hydraulic pumps are provided substantially orthogonal to each other.

21. The arrangement structure of the swash plate hydraulic pump according to claim 19,
wherein said driving shaft of said first swash plate hydraulic pump and said driving shaft of at least one of said second and subsequent swash plate hydraulic pumps are provided at a predetermined distance from each other.

22. The arrangement structure of the swash plate hydraulic pump according to claim 19,
wherein any of a bevel gear, a worm gear, and a hypoid gear is provided between said driving shaft of said first swash plate hydraulic pump and said driving shaft of at least one of said second and subsequent swash plate hydraulic pumps.

23. The arrangement structure of the swash plate hydraulic pump according to claim 19,
wherein a clutch is provided between said driving shaft of said first swash plate hydraulic pump and said driving shaft of at least one of said second and subsequent swash plate hydraulic pumps.

24. The arrangement structure of the swash plate hydraulic pump according to claim 19, wherein the end cap is a unitary construction.

* * * * *